United States Patent [19]

Latiolais et al.

[11] Patent Number: 5,631,325
[45] Date of Patent: May 20, 1997

[54] COPOLYMERS OF ETHYLENE AND ALKYL ACRYLATE WITH IMPROVED MELT-POINT TEMPERATURES

[75] Inventors: Jerry G. Latiolais, Groves; Nicholas R. Galante, Orange; J. Paul Gathright, Orange; James H. Wang, Orange, all of Tex.

[73] Assignee: Chevron Chemical Company, San Ramon, Calif.

[21] Appl. No.: 485,874

[22] Filed: Jun. 7, 1995

Related U.S. Application Data

[60] Division of Ser. No. 947,870, Sep. 21, 1992, Pat. No. 5,543,477, which is a continuation-in-part of Ser. No. 764,861, Sep. 24, 1991, abandoned.

[51] Int. Cl.⁶ .............................. C08L 23/02; C08L 23/08
[52] U.S. Cl. .................................................. 525/227
[58] Field of Search .................................................. 525/227

[56] References Cited

U.S. PATENT DOCUMENTS

| | | | |
|---|---|---|---|
| 2,953,541 | 9/1960 | Pecha | 525/227 |
| 2,953,551 | 9/1960 | White | |

FOREIGN PATENT DOCUMENTS

| | | | |
|---|---|---|---|
| 783 | 2/1979 | European Pat. Off. | 525/227 |
| 2733470 | 2/1979 | Germany | 525/227 |
| 902809 | 8/1962 | United Kingdom | 525/227 |
| 935603 | 8/1963 | United Kingdom | 525/227 |

*Primary Examiner*—David Buttner
*Attorney, Agent, or Firm*—Marianne H. Michel; Charles D. Holland

[57] ABSTRACT

Disclosed are copolymers of ethylene and alkyl acrylate monomers and methods of making those copolymers. Said copolymers exhibit increased melt-point temperatures and decreased hardness over similar conventional copolymers.

20 Claims, 11 Drawing Sheets

COPOLYMERS OF ETHYLENE AND ALKYL ACRYLATE WITH IMPROVED MELT-POINT TEMPERATURES

CROSS-REFERENCE TO RELATED APPLICATIONS

This application is a divisional application of Ser. No. 07/947,870, filed Sep. 21, 1992, now U.S. Pat. No. 5,543,477, which is a continuation-in-part of application Ser. No. 764,861, filed Sep. 24, 1991, now abandoned.

FIELD OF THE INVENTION

The present invention relates to copolymers of ethylene and an alkyl acrylate and processes for preparing said copolymers.

BACKGROUND OF THE INVENTION

Copolymers of ethylene and acrylate esters have been reported in the literature, such as in U.S. Pat. No. 3,350,372, issued Oct. 31, 1967 to Anspon et al. This patent discloses ethylene-acrylate ester copolymers wherein the acrylate esters include, for example, methyl acrylate, 2-butyl acrylate, 2-ethylhexyl acrylate, decyl acrylate, octadecyl acrylate and the corresponding esters of methacrylic acid.

U.S. Pat. No. 3,756,996, issued Sep. 4, 1973 to D. W. Pugh et al., which is hereby incorporated by reference in its entirety, discloses an apparatus and method for polymerizing ethylene and other monomers in a multi-zoned reactor system.

U.S. Pat. No. 4,351,931, issued Sep. 28, 1982 to Armitage, discloses high molecular weight, uniformly random copolymers of ethylene and acrylic or methacrylic acid which are made by maintaining a definite and constant ratio of acrylic acid to ethylene in a continuous-feed autoclave reactor having good mixing which maintains uniformity of the mixture throughout the entire reactor. These copolymers are limited to 10 wt % of the acid in order to provide improved handling and adhesive qualities.

The copolymerization of ethylene and an alkyl acrylate monomer (such as methyl acrylate) in a high-pressure autoclave reactor typically produces a copolymer resin, such as ethylene-methyl acrylate copolymer ("EMAC"), having a given alkyl acrylate content and a given melt-point temperature. The melt-point temperature of these copolymers has limited their use to those applications where the temperature of the article containing the copolymer remains safely below the melt-point temperature of the copolymer. A higher melt-point temperature for such copolymers, without affecting other properties such as the flexural stiffness and the adhesive properties of the copolymer, would allow their use in higher temperature applications. The present invention provides ethylene-alkyl acrylate copolymers with higher melt-point temperatures and processes for preparing them.

SUMMARY OF THE INVENTION

The present invention provides an ethylene-alkyl acrylate copolymer having an alkyl acrylate content of X weight percent, X being greater than 10 and being based on the total weight of ethylene and alkyl acrylate in the copolymer, said copolymer an average melt-point temperature equal to or greater than the value obtained from the expression:

$$\text{temperature (deg F.)} = 238 - 2.16X.$$

This invention also provides such copolymers having an average melt-point temperature less than the value obtained from the expression:

$$\text{temperature (deg F.)} = 257 - 1.56X.$$

The present invention also provides ethylene-methyl acrylate copolymers having a methyl acrylate content of Y weight percent, Y being greater than 10 and being based on the total weight of ethylene and methyl acrylate in the copolymer, said copolymer having an average melt-point temperature greater than the value obtained from the expression:

$$\text{temperature (deg F.)} = 248 - 2.9Y.$$

This invention also provides such copolymers having an average melt-point temperature less than the value obtained from the expression:

$$\text{temperature (deg F.)} = 263 - 2.3Y.$$

Also provided by the present invention is an ethylene-methyl acrylate copolymer having a melt-point temperature of about 197° F. and a methyl acrylate content of about 20 weight percent, based on the total weight of ethylene and methyl acrylate in the copolymer.

Further provided by the present invention are ethylene-butyl acrylate copolymers having a butyl acrylate content of Z weight percent, Z being greater than 15 and based on the total weight of ethylene and butyl acrylate in the copolymer, said copolymer having an average melt-point temperature greater than the value obtained from the expression:

$$\text{temperature (deg F.)} = 240 - 2.1Z.$$

This invention also provides such copolymers having an average melt-point temperature less than the value obtained from the expression:

$$\text{temperature (deg F.)} = 253 - 1.35Z.$$

Further provided in accordance with the present invention is an ethylene-butyl acrylate copolymer having a melt-point temperature of about 206° F. and a butyl acrylate content of about 20 weight percent, based on the total weight of ethylene and butyl acrylate in the copolymer.

Also provided in accordance with this invention is an ethylene-alkyl acrylate copolymer having less than a 0.1 (preferably less than a 0.06) difference between the maximum loss tangent value and the minimum loss tangent value in the range 32°–140° F.

This invention further provides an ethylene-alkyl acrylate copolymer having a rate of change of loss tangent with temperature less than or equal to $2.0 \times 10^{-3}$ °F$^{-1}$.

This invention also provides ionomers of the ethylene-alkyl acrylate copolymers of this invention having about 2 to about 90 percent, preferably about 5 to about 70 percent, more preferably about 10 to about 60 percent of the alkyl acrylate groups ionized by saponification with alkali metal cations, preferably sodium ions.

The present invention further provides the ethylene-alkyl acrylate copolymers of this invention modified with an unsaturated acid anhydride. These modified copolymers comprise about 0.05 to about 5, preferably about 0.1 to about 5, more preferably about 0.1 to about 2.0 weight percent unsaturated acid anhydride grafted onto the copolymer.

Also provided in accordance with this invention are free-standing films made from the ethylene-alkyl acrylate copolymers or ionomers of this invention.

In accordance with this invention there are also provided homogeneous blends of a polyolefin, e.g., polyethylene, and the ethylene-alkyl acrylate copolymers of this invention, as well as free-standing films made from these blends.

Also provided by this invention is a multi-layer extrusion comprising at least one layer comprised of an ethylene-alkyl acrylate copolymer of this invention, an anhydride-modified ethylene-alkyl acrylate copolymer of this invention or an ionomer of this invention and at least one layer comprising a dissimilar material.

Further provided in accordance with this invention is a laminated structure comprising at least two layers of material bound by a binder layer, said binder comprising an ethylene-alkyl acrylate copolymer of this invention, an anhydride-modified ethylene-alkyl acrylate copolymer of this invention or an ionomer of this invention.

The present invention further provides a process for the preparation of ethylene-alkyl acrylate copolymers comprising:

A. feeding overall an amount by weight, A, of alkyl acrylate and an amount by weight, E, of ethylene to a multi-zoned polymerization reactor;

B. introducing an effective amount of an initiator and at least a portion, $E_1$, of the total amount of ethylene into a first reaction zone of the reactor;

C. concurrently introducing a portion, $A_1$, of alkyl acrylate to said first reaction zone such that (1) greater than about 55% of the overall amount of alkyl acrylate is introduced into said first reaction zone, (2) the amount, $A_1$, of alkyl acrylate fed to said first reaction zone is greater than the total amount of alkyl acrylate fed to all subsequent reaction zones, and (3) the ratio of $A_1$ to $E_1$ in said first reaction zone is equal to or greater than the ratio of A to E for the reactor overall; and D. feeding any remaining portions of initiator, ethylene and alkyl acrylate to a subsequent reaction zone or zones.

This invention also includes this process wherein the ratio of $E_1$ to E is between about 0.25 and about 0.75, preferably about 0.50, and/or wherein the ratio of $A_1$ to $E_1$ is greater than 1.2, preferably greater than 1.4 times the ratio of A to E. The present invention also includes the product of this process.

The present invention also provides a process for the preparation of ethylene-alkyl acrylate copolymers comprising introducing to a first reaction zone in a multi-zone reactor, initiator, ethylene and a quantity of an alkyl acrylate which is (1) in excess of 50% of the amount of alkyl acrylate fed overall to the reactor and (2) greater than the total amount of alkyl acrylate fed to all subsequent reaction zones, said quantity of alkyl acrylate being effective to increase the average melt-point temperature of said copolymers at least about 8° F. over the melt-point temperature of a copolymer having the same alkyl acrylate content by weight as said produced copolymer and made by introducing about 50% of the alkyl acrylate fed overall to the reactor to said first reaction zone and about 50% of the ethylene fed overall to the reactor to said first reaction zone.

This invention also includes this process wherein the ratio of $E_1$ to E is between about 0.25 and about 0.75, preferably about 0.50, and/or wherein the ratio of $A_1$ to $E_1$ is greater than 1.2, preferably greater than 1.4 times the ratio of A to E. The present invention also includes the product of this process.

The present invention also provides an improved process for making copolymers of ethylene and alkyl acrylate comprising feeding overall an amount by weight, A, of alkyl acrylate and an amount by weight, E, of ethylene to a multi-zoned polymerization reactor in the presence of initiator, and maintaining a ratio of the amount by weight, $A_1$, of alkyl acrylate to the amount by weight, $E_1$, of ethylene in a first reaction zone of the reactor that is about equal to the overall A to E ratio, wherein the improvement comprises (1) having $A_1$ be greater than about 55% of A, (2) having $A_1$ be greater than the total amount of alkyl acrylate introduced into all subsequent reaction zones, and (3) maintaining a ratio of $A_1$ to $E_1$ in said first reaction zone that is equal to or greater than the overall A to E ratio fed to the reactor.

This invention also includes this process wherein the ratio of $E_1$ to E is between about 0.25 and about 0.75, preferably about 0.50, and/or wherein the ratio of $A_1$ to $E_1$ is greater than 1.2, preferably greater than 1.4 times the ratio of A to E. The present invention also includes the product of this process.

Among other factors, the present invention is based on the discovery that when ethylene-alkyl acrylate copolymers are made in a high-pressure, multi-zoned polymerization reaction in which more than about 55% of the total alkyl acrylate monomer used to produce the copolymer is introduced into a first reaction zone, ethylene-alkyl acrylate copolymers are produced which have higher melt-point temperatures than conventional, commercially available ethylene-alkyl acrylate copolymers, while other properties such as the flexural stiffness and the adhesive properties of the copolymer remain essentially unchanged. The higher melt-point temperatures of the copolymers of this invention permit their use in products which are subjected to higher temperatures.

DETAILED DESCRIPTION OF PREFERRED EMBODIMENTS

Figure 1:
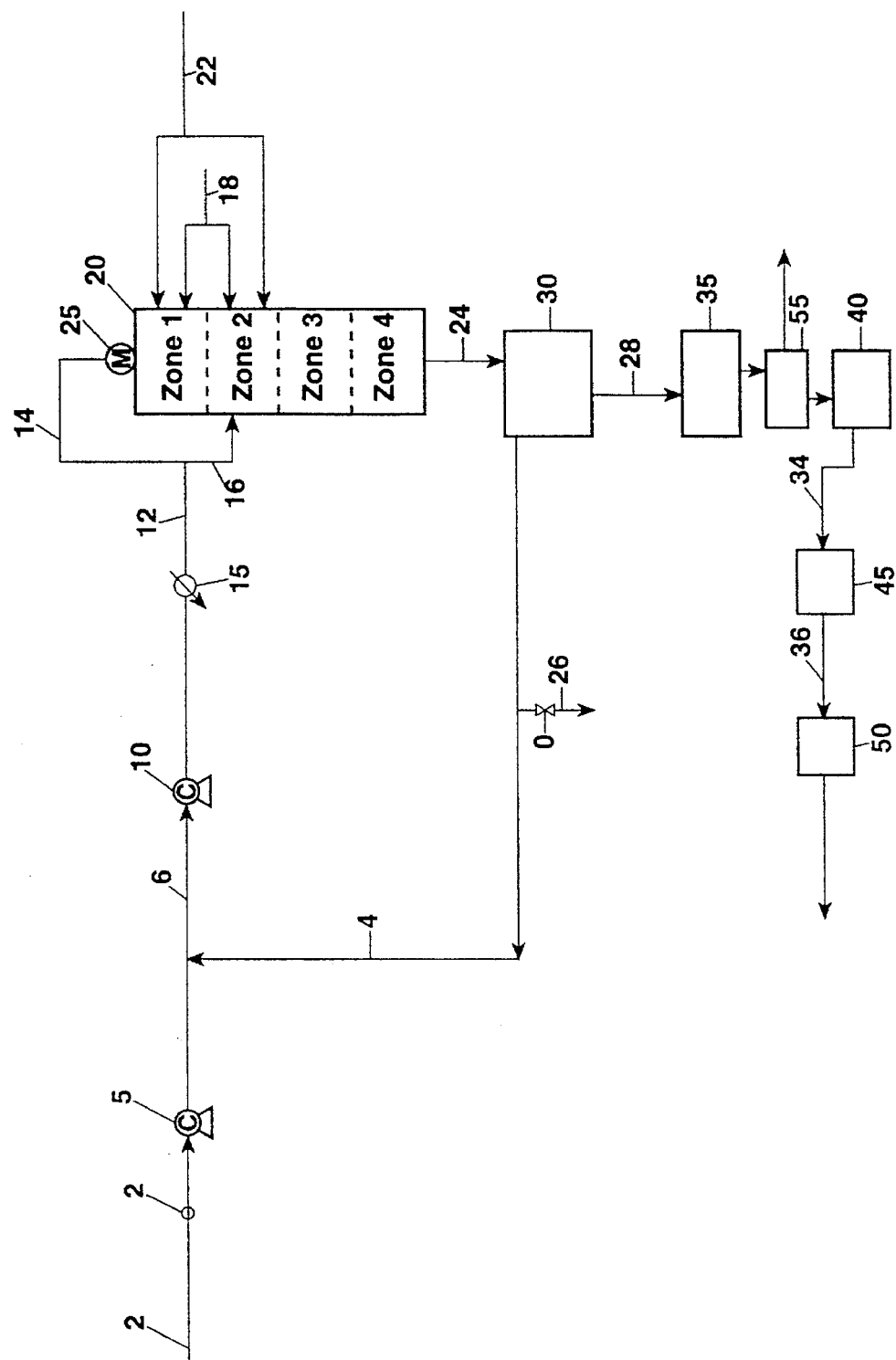
FIG. 1 is a schematic diagram of a preferred embodiment of the process of the present invention.

According to one embodiment of the present invention, a high-pressure process is provided for producing ethylene-alkyl acrylate copolymers. As used herein, the term "ethylene-alkyl acrylate copolymer" refers to copolymers of ethylene and acrylic esters of linear, branched or cyclic alcohols having 1–28 carbon atoms. Mixtures of these acrylic esters may also be used to prepare the copolymers of this invention. In addition, minor amounts of other monomers may be used, provided they do not materially affect the properties of the copolymers of this invention. The alkyl acrylate comonomers are exemplified by methyl acrylate, ethyl acrylate and butyl acrylate, and the ethylene-alkyl acrylate copolymers are exemplified by ethylene-methyl acrylate copolymer ("EMAC"), ethylene-ethyl acrylate copolymer ("EEAC") and ethylene-butyl acrylate copolymer ("EBAC").

The ethylene-alkyl acrylate copolymers of this invention typically contain about 10–50 wt % alkyl acrylate and about 90–50 wt % ethylene, preferably about 20–40 wt % alkyl acrylate and about 80–60 wt % ethylene, more preferably about 15–40 wt % alkyl acrylate and about 85–60 wt % ethylene. A particularly preferred copolymer contains about 20 wt % alkyl acrylate and about 80 wt % ethylene. All weight percentages are based on the combined weight of alkyl acrylate and ethylene.

I. PROCESS OF MAKING THE COPOLYMERS OF THIS INVENTION

As used herein, the following terms have the following meanings:

1. "A" is used herein to denote the total amount by weight of alkyl acrylate fed to the reactor.
2. "$A_1$" is used to denote the portion of the amount A which is fed to first reaction zone in said reactor.
3. "E" is used to denote the total amount by weight ethylene fed to the reactor.
4. "$E_1$" is used to denote the portion of the amount E which is fed to the first reaction zone.

One appropriate measure of these amounts is pounds (mass).

5. "First reaction zone" refers to the area in a reactor where ethylene and alkyl acrylate come into contact under polymerization conditions, and a substantial amount of polymerization occurs. However, the "first reaction zone" need not be the first in a sequence of zones in the reactor. For example, ethylene and/or alkyl acrylate could be introduced into a zone of the reactor prior to the "first reaction zone," but if no significant polymerization occurs in this prior zone (e.g., less than about 5% of the total reaction takes place), this zone is not considered herein to be the "first reaction zone."
6. "Reaction zone" refers to an area within a single reaction vessel in which polymerization of the ethylene and/or alkyl acrylate takes place. Typically, the "reaction zone" is a portion of a single reaction vessel which is segregated from other areas of the same reaction vessel. This segregation can be accomplished by physical barriers (such as baffles and the like), or other suitable means (such as the mixing patterns within the reaction vessel). As used herein, the term "reaction zone" also includes areas in separate, multiple reaction vessels where polymerization occurs.

The process can best be understood in conjunction with FIG. 1 which illustrates, in schematic form, a process for the manufacture and recovery of ethylene-alkyl acrylate copolymers. Referring to FIG. 1, this process starts by feeding ethylene gas through line 2 via primary compressor 5. The gas exits the compressor into line 6.

Line 6 is also the suction line for secondary compressor 10. The ethylene feed is compressed by secondary compressor 10 and discharges into line 12. The high-pressure feed is cooled in cooler 15. The ethylene feed stream is then fed to reactor 20.

Although multiple reactors may be used, in one preferred embodiment, the process uses a multi-zoned, high-pressure autoclave reactor. A 4-zone reaction system is preferred and is exemplified in FIG. 1, although additional zones, such as six, or fewer zones, such as two zones, can be used.

Preferably, the ethylene is fed into the top of the reactor through line 14 and into Zone 1. The reactor zones are numbered from top to bottom. Alkyl acrylate monomer is fed to the reactor through line 22 in an overall amount by weight of A pounds, and is divided to feed selected zones. In one embodiment, Zone 1 is fed $A_1$ pounds, and Zone 2 is fed (A—$A_1$) pounds.

In a continuous process like the four-zone autoclave reactor pictured in FIG. 1, the total feed of alkyl acrylate relative to the total ethylene feed determines the alkyl acrylate content of the final copolymer. A copolymer containing 20 wt % alkyl acrylate has a smaller total feed ratio of alkyl acrylate to ethylene (A/E) than a copolymer containing 30 wt % alkyl acrylate. To achieve the desired product, an overall A/E feed ratio is chosen and generally maintained throughout a production run, although the ratio A/E can be varied over time to produce copolymers containing different weight percentages of alkyl acrylate.

As used herein, the term "conventional ethylene-alkyl acrylate copolymers" refers to those ethylene-alkyl acrylate copolymers which are made by dividing the ethylene monomer and alkyl acrylate monomer equally among the reactor zones to which monomers are fed. Thus, for a conventional ethylene-alkyl acrylate copolymer requiring overall that A amount by weight of alkyl acrylate monomer be fed to the reactor and E amount by weight of ethylene monomer be fed to the reactor, and for a four-zone reactor with two zones chosen for feeding reactants into the reactor, as illustrated in FIG. 1, the ratio of the amount, $A_1$, of alkyl acrylate in a first reaction zone, to the amount, $E_1$, of ethylene in said first reaction zone is equal to the ratio of the amount of alkyl acrylate fed to a second reaction zone, A—$A_1$, to the amount of ethylene fed to a second reaction zone, E—$E_1$, (i.e., the ratio A—$A_1$/E—$E_1$), and is equal to the ratio of the overall amount of alkyl acrylate A to the overall amount of ethylene E (i.e., the ratio A/E).

It has quite surprisingly been discovered that the ratio of the amount by weight of alkyl acrylate monomer to the amount by weight of ethylene monomer in a first reaction zone ($A_1/E_1$) relative to the ratio of the overall amount by weight of alkyl acrylate monomer to the overall amount by weight of ethylene monomer (A/E) is critical to obtain the improved properties of the ethylene-alkyl acrylate copolymer of this invention. It has unexpectedly been found that if the ratio $A_1/E_1$ is equal to or greater than the overall ratio A/E required to make the ethylene-alkyl acrylate copolymer, and if $A_1$ is at least about 55% of A and exceeds the amount of alkyl acrylate, if any, fed to all subsequent zones, then the melt-point temperature of the copolymer is significantly increased over conventional copolymers having the same alkyl acrylate content.

In one preferred embodiment of the invention, the ethylene, E, fed to the 4-zone reactor 20 of FIG. 1 is divided so that $E_1$, the amount of ethylene in a first reaction zone (in this case, Zone 1, fed through line 14), is about 25% to 75%, and, more preferably, about 50%, of E. About 75% to 25%, and more preferably about half, of the ethylene monomer is fed into Zone 2 through line 16. $A_1$ is controlled such that $A_1$ is greater than 55%, preferably at least 70%, of A and such that the ratio $A_1/E_1$ is equal to or greater than the ratio of A/E. Preferably, the ratio $A_1/E_1$ is greater than about 1.4, and more preferably is in excess of 1.8, times the ratio A/E. Most preferably, all of the alkyl acrylate is added to said first reaction zone in order to attain ethylene-alkyl acrylate copolymers having the highest melt-point temperatures.

The preferred temperature in said first reaction zone is about 300° F. to 450° F., and more preferably is about 325° F. to 425° F.

It has also been found that high pressures are preferred when producing ethylene-alkyl acrylate copolymers in accordance with the present invention. The reaction zone pressure preferably is about 10,000 to about 40,000 psig, more preferably about 15,000 to about 35,000 psig, and most preferably is about 20,000 to about 30,000 psig.

A free radical initiator is preferably used to catalyze the polymerization. The initiator can be added into any zones where polymerization is desired. The initiator preferably is fed into at least the first reaction zone in a sufficient amount and rate whereby the temperature of the liquid phase in the reaction zone is controlled in the range specified above. For example, in the process of FIG. 1, the initiator can be added into Zone 1 or to both Zone 1 Zone 2 through line 18. Optionally, the initiator can be added to Zones 3 and 4 as well.

The initiator may be added to the reaction zone(s) in any suitable manner. Generally, it is dissolved in a suitable solvent, typically a hydrocarbon, and injected into the zone (s). Normally, the initiator and alkyl acrylate are simultaneously injected into the reaction zone(s), though this is not essential. In a preferred embodiment, the initiator and alkyl acrylate are simultaneously injected into the reaction zone via concentric tubes, one carrying the initiator and the other carrying the alkyl acrylate.

Examples of initiators useful in the practice of this invention include, but are not limited to, peroxides such as lauroyl peroxide, t-butyl perbenzoate, t-butyl peroxypivalate and di-t-butyl peroxide. A preferred initiator is t-butyl peroxypivalate. Typically, the initiator is dissolved in a liquid hydrocarbon such as hexane or mineral oil.

In preparing the ethylene-alkyl acrylate copolymers of this invention, it is desirable to add an oxygen scavenging compound to the reaction mixture. Phenolic compounds are useful in this regard. These phenolic compounds include 2,6-di-t-butyl-4-methylphenol (BHT) and 2,6-di-t-butyl-4-ethylphenol (BHEB). These compounds are well known in the art; see U.S. Pat. No. 3,941,747, issued Mar. 2, 1976 to Roth et al., which is incorporated herein by reference. A preferred compound is BHEB. The addition of the oxygen scavenging compound is at a rate such that the concentration of the compound is preferably 0.01 to 0.5, more preferably 0.05 to 0.10 wt %, of the total copolymer produced.

The reaction mixture is agitated within said first reaction zone to produce both radial and longitudinal mixing. Preferably a substantially uniform reaction temperature is maintained.

The reaction mixture proceeds from the first reaction zone into a second reaction zone. The reaction mixture in the second zone preferably is agitated to produce good radial and longitudinal mixing. Preferably, the remaining alkyl acrylate monomer, ethylene and additional free radical initiator are introduced into the second reaction zone. Also preferably, the three components are added separately. The initiator is fed into the second reaction zone in a sufficient amount and rate whereby the temperature of the liquid phase in the final reaction zone is controlled to about 350° F. to 450° F., more preferably to about 350° F. to 425° F., and most preferably 375° F. to 425° F.

Preferably, there are one or more reaction zones after the second reaction zone which are used to further polymerize the ethylene and alkyl acrylate monomers. Referring to FIG. 1, the reaction mixture is removed from the end of Zone 2 (the second reaction zone, in this case) and introduced into two additional reaction zones, where the mixture is agitated to produce both radial and end-to-end mixing.

The reaction mixture is removed from the final reaction zone. The product, which contains ethylene-alkyl acrylate copolymer, unreacted ethylene and other impurities, leaves reactor 20 of FIG. 1 and is transferred, via pressure differential, through line 24 to separator 30. In separator 30, the molten copolymer is separated from the unreacted ethylene, and the ethylene is recycled back, via line 4, to the suction of secondary compressor 10. A voluntary purge is removed from the recycle, via line 26, in a sufficient amount to obtain the desired purity of the ethylene returning to secondary compressor 10. Impurities that need to be removed include telogens, which reduce the molecular weight of the polymer, as well as other process compounds affecting the purity of the recycled ethylene. The molten polymer leaves separator 30 and is transferred, via line 28, to hopper 35. Transfer is accomplished by a pressure differential between separator 30 and hopper 35.

In the preparation of polymers, as in bulk and solution polymerization or by other standard methods, considerable amounts of starting materials, such as unreacted monomer or solvent, remain admixed or entrained in the polymer product. This contamination of polymer is undesirable because of well known adverse effects on polymer properties. Since the contaminants in most cases are volatile relative to their polymeric hosts, they are removed from the condensed phase (polymer) by evaporation into a contiguous gas phase. Such separation processes are commonly referred to as devolatilization ("DV"). The process of devolatilization in DV zone 55 of FIG. 1 is preferably used to prevent these volatile components from contaminating the copolymer product. This is done before the product is fed to gear pump and pelletizer 40.

In one embodiment of the invention, devolatilization is accomplished by venting the volatile components prior to extrusion. However, devolatilization is well known in the art, and other methods may be used or adapted. See "Encyclopedia of Polymer Science & Engineering", 2d Ed., Vol. 4, pp. 745–51 (1986), which is incorporated herein by reference.

The ethylene-alkyl acrylate copolymers of the present invention are typically produced in the form of pellets. If the surface of the pelletized ethylene-alkyl acrylate copolymer tends to be sticky, it is preferable to coat or dust the pellets to prevent agglomeration. Coating agents selected from the group consisting of silicas, talc, and powdered polyolefins are used. Preferably, talc or powdered polyethylene is used. Preferably, integral to the coating step, the pellets are classified according to their size for packaging.

II. IMPROVED PROPERTIES OF THE COPOLYMERS AND THEIR USES

There are several improved properties of the copolymers of this invention that are particularly advantageous. These include an increased melt-point temperature, reduced Vicat softening point and enhanced chemical stability.

A. Higher Melt-Point Temperatures

The copolymers of this invention have surprisingly higher melt-point temperatures than ethylene-alkyl acrylate copolymers prepared using conventional methods. As can be seen from the data of Table 1 (in Example 1) and FIG. 2 for EMAC, and the data in Table 1 and FIG. 3 for EBAC, the melt-point temperatures of the ethylene-alkyl acrylate copolymers of the present invention are about 10°–20° F. higher than the melt-point temperatures of conventional ethylene-alkyl acrylate copolymers having corresponding alkyl acrylate content. These melt-point differences increase as the alkyl acrylate content of the copolymers increases.

The lowest melt-point temperature for the ethylene-alkyl acrylate copolymers of this invention can be expressed in terms of the alkyl acrylate content of the copolymer, denoted by "X" where X is greater than ten:

$$\text{temperature (deg F.)} = 238 - 2.16X. \qquad \text{Eq.1}$$

The highest melt-point temperature which is expected for the ethylene-alkyl acrylate copolymer of this invention can be expressed in terms of the alkyl acrylate content of the copolymer, denoted by "X" where X is greater than ten:

$$\text{temperature (deg F.)} = 257 - 1.56X. \qquad \text{Eq.2}$$

For EMAC of this invention, the relationship of the lowest melt-point temperature to MA content, denoted by "Y" where Y is greater than ten, is:

$$\text{temperature (deg F.)} = 248 - 2.9Y. \qquad \text{Eq.3}$$

For EMAC of this invention, the expected relationship of the highest melt-point temperature to MA content, denoted by "Y" where Y is greater than ten, is:

$$\text{temperature (deg F.)} = 263 - 2.3Y. \qquad \text{Eq.4}$$

For EBAC of this invention, the relationship of the lowest melt-point temperature to BA content, denoted by "Z" where Z is greater than 15, is:

$$\text{temperature (deg F.)} = 240 - 2.1Z. \qquad \text{Eq.5}$$

For EBAC of this invention, the expected relationship of the highest melt-point temperature to BA content, denoted by "Z" where Z is greater than 15, is:

$$\text{temperature (deg F.)} = 253 - 1.35Z. \qquad \text{Eq.6}$$

Figure 2:
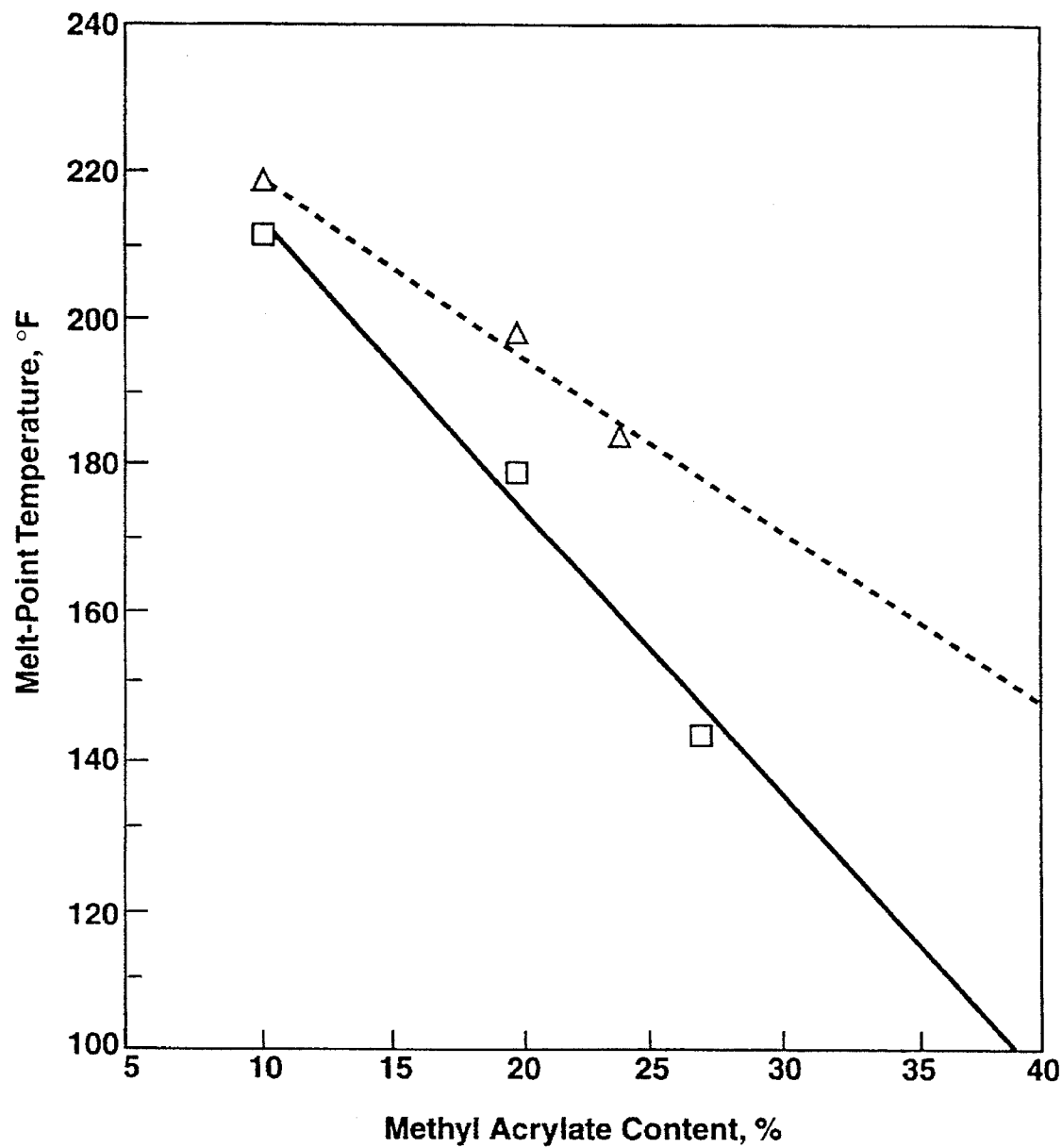
FIG. 2 shows a typical relationship of melt-point temperature and weight percent methyl acrylate for EMAC of this invention and for conventional EMAC.
Figure 3:
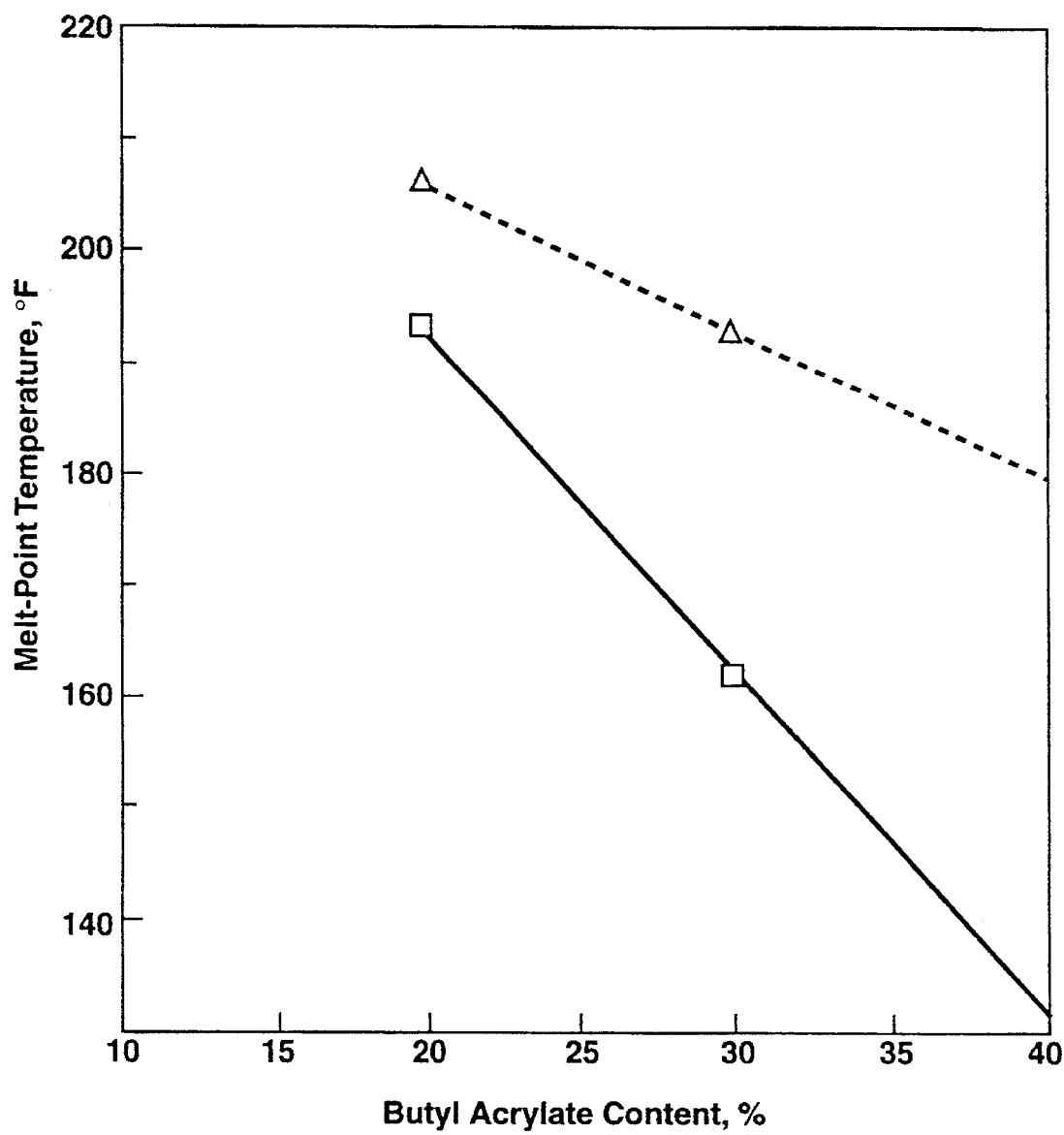
FIG. 3 shows a typical relationship of melt-point temperature and weight percent butyl acrylate for ethylene-butyl acrylate copolymers ("EBAC") of this invention and for conventional EBAC.

Equations 1–6 are derived from plots alkyl acrylate, methyl acrylate, or butyl acrylate content in the ethylene-alkyl acrylate copolymers versus melt-point temperature. Typical plots for EMAC and EBAC are shown in FIGS. 2 and 3.

Higher melt-point temperatures are an advantage in applications where higher end-use temperatures are required or where the product is potentially subject to high temperatures. For example, EMAC and EBAC are used to fabricate gaskets and plastic valve components. These articles may be subject to high temperatures during shipping, storage or use. Less shape distortion would occur at these temperatures using the high-melt-point copolymers of this invention. Indeed, the higher melt-point products of this invention provide for a broader range of useful operating temperatures and thereby increase the number of potential applications for ethylene-alkyl acrylate copolymers.

The high melt-point copolymers of this invention are useful in blends with other polymeric materials. Here, the melt-point of the ethylene-alkyl acrylate copolymer can be chosen to better match the other blend component(s) and the requirements of the desired application. Again, these blends could be used in applications requiring higher temperatures.

Copolymers of this invention are quite useful as adhesives, especially in extrudable film applications such as multi-layer extrusions. Such applications could include, for example, automotive door panels. Here, the adhesive must be stable to a temperature of about 180° F. to withstand the heat of a car interior on a hot day.

The ethylene-alkyl acrylate copolymers of the present invention are useful in preparing polymer blends which, in turn, are useful in making films. For example, the ethylene-alkyl acrylate copolymers of this invention can be blended with a polyolefin such as polyethylene by melt blending techniques to produce a composition which is useful in preparing films. As used herein, the term "polyolefin" refers to homopolymers and copolymers of alpha-olefins having from 2 to about 8 carbon atoms, such as high density polyethylene, low density polyethylene, linear low density polyethylene, and polypropylene.

When making films, it is desirable to add anti-block and slip additives to aid with processing and handling of the films. Slip additives are preferably added in the range of about 0.1 to about 0.5 wt % of the polymer. Useful slip additives include high molecular weight paraffinic amides, such as stearamide, oleamide and erucamide. Anti-block additives are preferably added in the range of about 0.3 to about 1.5 wt % of the polymer. They have very small particle size and are preferably natural or synthetic silicas, diatomaceous earths and talc.

In sum, the improved melt-point temperature allows use of the copolymers of this invention where previous ethylene-alkyl acrylate copolymers could not be used due to their lower melt-point temperatures.

B. Vicat Softening Point/Hardness

Quite surprisingly, the ethylene-alkyl acrylate copolymers of this invention have, for a given alkyl acrylate content, Vicat softening points are which generally lower than conventional ethylene-alkyl acrylate copolymers having the same alkyl acrylate content. When this is coupled with the fact that the melt-point temperatures of the copolymers of this invention are higher than those of the corresponding conventional copolymers, this result is very surprising. Normally, one would expect the Vicat softening point of the copolymers of this invention to increase in direct proportion to their increased melt-point temperature. Since the Vicat softening point decreases, the ethylene-alkyl acrylate copolymers of this invention display an effect opposite to that which would be expected.

The copolymers of this invention also have reduced Shore A and Shore D hardness. These products are softer and more flexible than conventional ethylene-alkyl acrylate copolymers. This is particularly surprising in view of the higher melt-point temperature. For example, conventional EBAC with about 21 wt % butyl acrylate has an average Shore A hardness of about 91 and an average Shore D hardness of about 32, while the EBAC of this invention at about the same weight percent (about 22 wt %) butyl acrylate has an average Shore A hardness of about 89 and an average Shore D hardness of about 30, as measured by ASTM Test Method Number D1706, which is incorporated herein by reference. The improved softness and flexibility are advantages for such uses as plastic gloves and upholstery film.

C. Viscous and Elastic Properties

The viscous and elastic properties of a copolymer are important performance indicators. Dynamic mechanical analysis properties are determined using a dynamic mechanical analyzer (DMA), for example, the Rheometrics RDA-700. This instrument resolves the viscous and elastic nature of copolymer samples tested at various temperatures and shear rates.

Using the DMA, sinusoidal strains are imposed as an oscillatory shear to samples in a parallel-plate viscometer configuration. The amplitude of the stress is measured by determining the torque transmitted through the sample in response to the imposed strain. The strain amplitude and frequency are input variables, set by the operator.

Depending on the relative viscous and elastic nature of the sample at the particular test conditions, the sinusoidal stress response to the imposed sinusoidal shear strain may be out of phase. If the copolymer were to behave as a purely viscous liquid (i.e., no elasticity), the peak stress response would lag 90° behind the imposed sinusoidal shear strain. With increasing elastic response, the peak stress response becomes increasingly in-phase with the shear strain.

The DMA determines the peak stress and peak strain. The ratio of the peak stress to the peak strain is the absolute value of the modulus, or the complex shear modulus, |G*|.

|G*|=peak stress/peak strain    Eq.7

The in-phase component of |G*|, the dynamic shear storage modulus, or G', equals the stress in-phase with the shear strain divided by the strain, or:

G'=|G*|cos(Δ)    Eq.8 where Δ is the phase shift angle between the applied maximum shear strain and the maximum shear stress.

The out-of-phase component of |G*|, the dynamic shear loss modulus, or G", equals the stress 90° out of phase with the shear strain divided by the strain, or G"=|G*|sin (Δ)    Eq.9

Typical units for |G*|, G' and G" are Pascals (SI) or dynes/cm$^2$ (cgs).

An important performance-related property of a copolymer is the ratio of G" to G'. This is called the loss tangent.

Loss Tangent=tan (Δ)=G"/G'    Eq.10

This loss tangent is a measure of the stiffness or ease of deformation of the copolymer. A detailed discussion of DMA is published in "Asphalt and Polymer Modified Asphalt Properties Related to the Performance of Asphalt Concrete Mixes", *Proc. of the Association of Asphalt Paving Technologists*, Vol. 58 (1988) by J. L. Goodrich.

The copolymers of this invention exhibit surprisingly consistent loss tangent values between 32° F. and 140° F. Where conventional copolymers can have a difference in excess of 0.1 between the minimum and maximum loss tangent values for the temperature range 32° F. to 140° F., the novel copolymers of this invention exhibit less than a 0.06 difference between minimum and maximum loss tangent values in this temperature range. For example, both the EMAC and EBAC of this invention had about a 0.04 difference in loss tangent values between 32° F. and 140° F.

Figure 8:
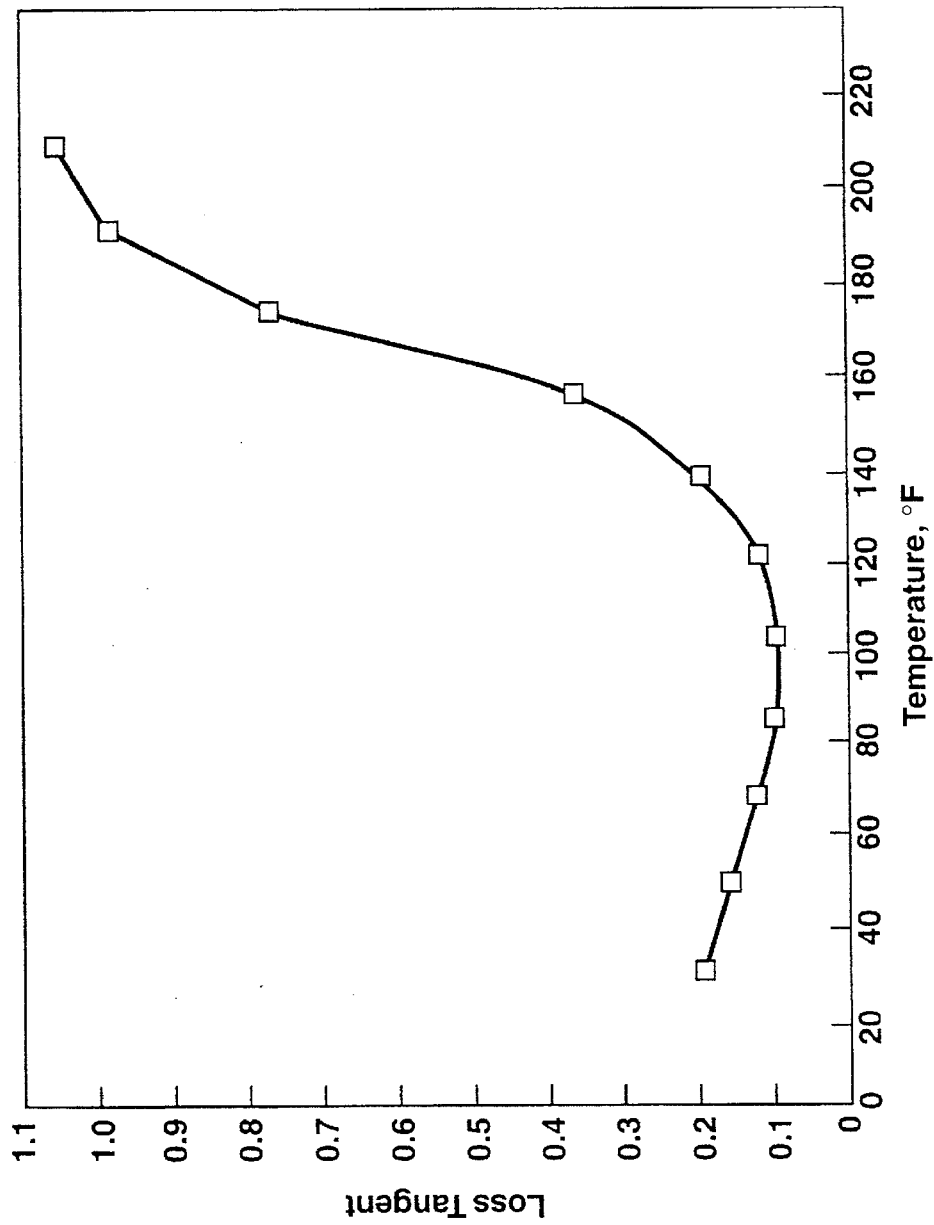
FIGS. 8–11, respectively, are graphs of tan delta (loss tangent) values measured at a frequency of 10 rads/sec. for conventional EMAC, EMAC of this invention, conventional EBAC, and EBAC of this invention as the temperature of the copolymer sample is varied from 32° F. to 212° F.
Figure 9:
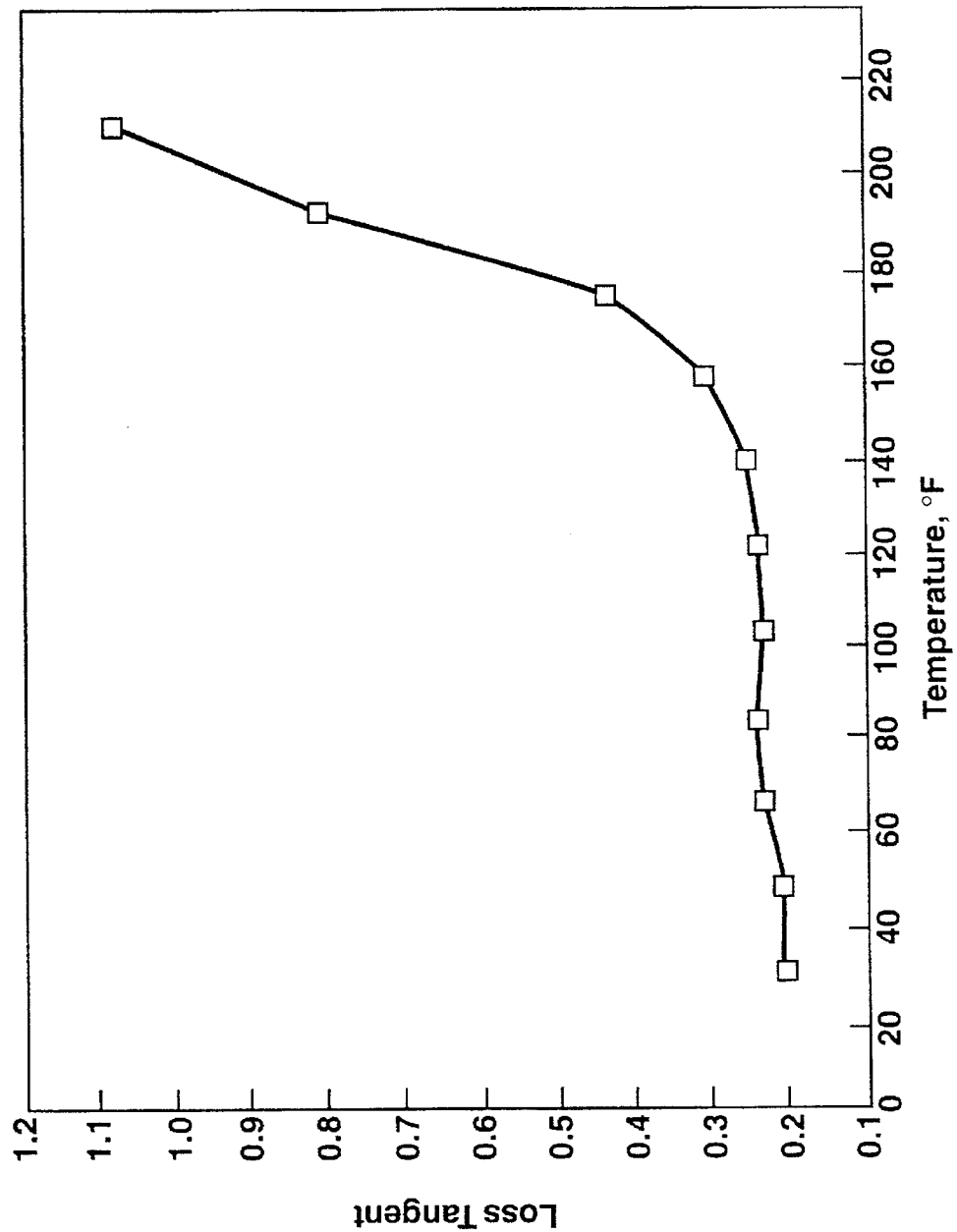
Figure 10:
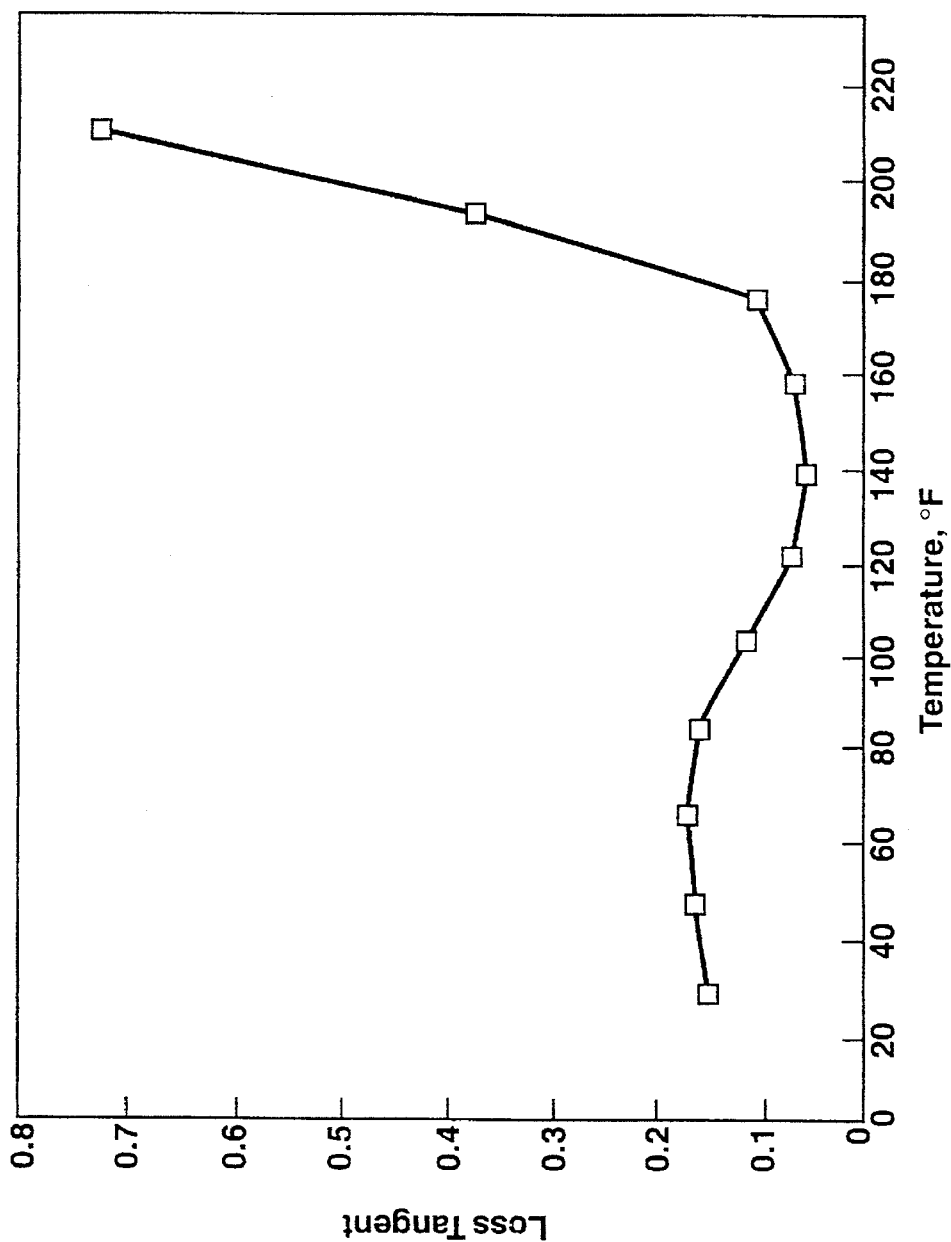
Figure 11:
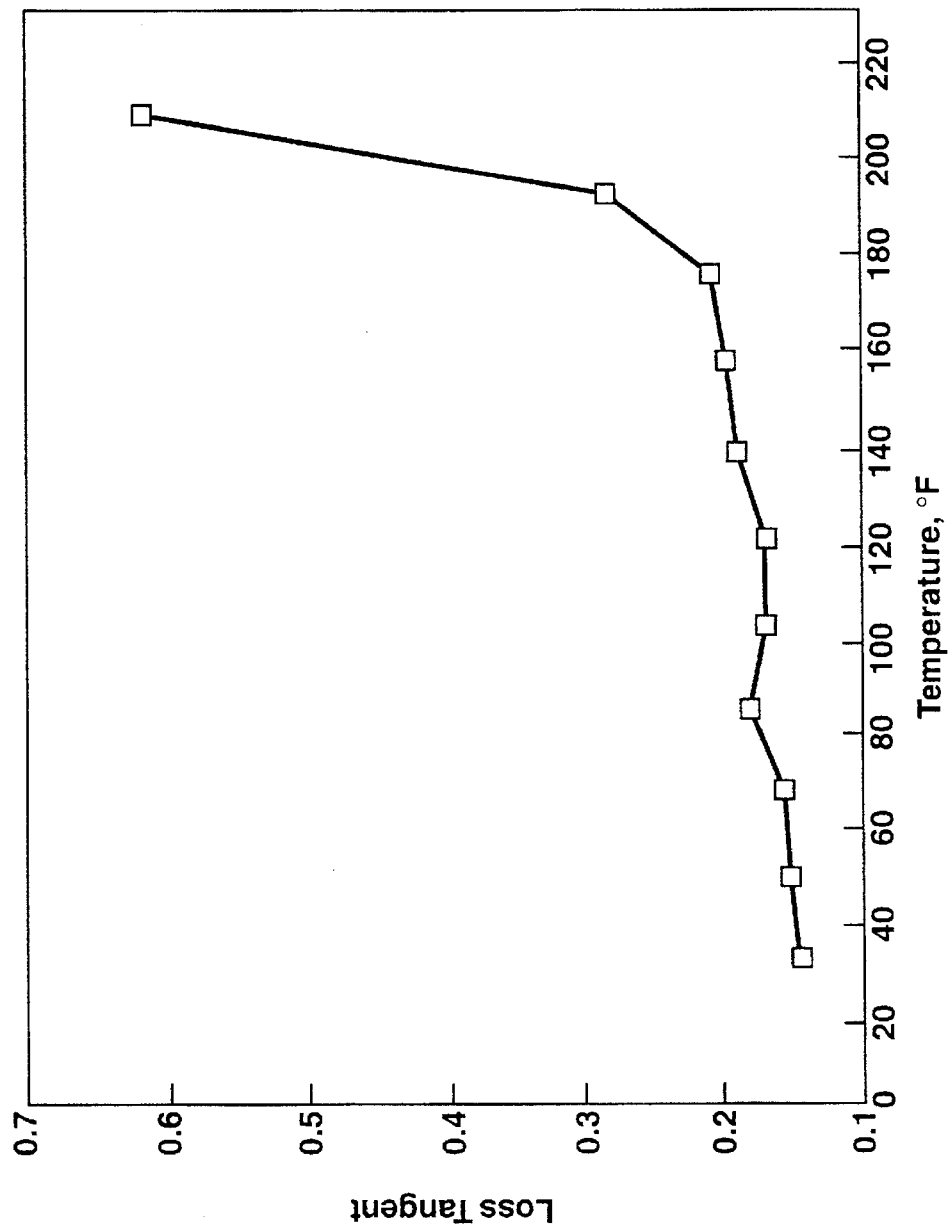

Conventional copolymers also exhibit a marked rate of change of the loss tangent with temperature as the temperature increases from 32° F. to 140° F., as shown for conventional EMAC in FIG. 8 and for conventional EBAC in FIG. 10. Conventional copolymers exhibit a significant decrease in the loss tangent value with increasing temperature between about 32° F. and about 104° F. This is followed by a significant increase in the loss tangent value as the temperature increases from about 104° F. to about 140° F. and above. As a result, conventional copolymers typically exhibit a change in loss tangent with temperature in excess of $2.8 \times 10^{-3}$ °F.$^{-1}$, and can exceed $5.0 \times 10^{-3}$ °F.$^{-1}$. In contrast, the copolymers of this invention retain an almost constant loss tangent value as the temperature increases from 32° F. to 140° F., as exhibited by FIG. 9 for an EMAC of this invention and by FIG. 11 for an EBAC of this invention. Thus, the rate of change of the loss tangent with temperature is smaller, and is typically less than $2.0 \times 10^{-3}$ °F.$^{-1}$. As a result, products made with the copolymers of this invention will show less variability in their loss tangent values where they are exposed to temperatures from 32° F. to 140° F.

D. Improved Chemical Stability

Additionally, the new materials have improved chemical stability, as exhibited by their solvent resistivity. When 1 mil films of either copolymers of this invention alone or copolymers of this invention in combination with low-density polyethylene are contacted with hexane or xylene, the amount of film dissolved is significantly less than the amount dissolved from films made with conventional copolymers, as illustrated in Table 2 in Example 4.

III. DERIVATIVES OF THE COPOLYMERS OF THIS INVENTION

Derivatives of the copolymers of this invention as described below also possess improved properties, such as higher melt-point temperature. This will permit use of these derivatives in a wider range of applications; for example, derivatives may be used in multi-layer extrusions or elsewhere where adhesion is desired, e.g., where gas barrier films are adhered to rigid plastics or other materials which are to be used in higher temperature applications. A variety of derivatives may be produced using methods well known in the art.

A. Ionomers from the Ethylene-Alkyl Acrylate Copolymers of this Invention

The polymers of the present invention can be partially or totally saponified to produce ionomers by reacting an ethylene-alkyl acrylate copolymer of this invention and an aqueous solution of an inorganic alkali metal base at a temperature sufficient for saponification to occur.

Among other factors, the present invention is based on the discovery that (1) ionomers made from the ethylene-alkyl acrylate copolymers of this invention have higher melt-points than ionomers made from conventional ethylene-alkyl acrylate copolymers, (2) the ionomers of this invention have higher melt strength than ionomers made from conventional ethylene-alkyl acrylate copolymers which results in better processability at higher temperatures, e.g., they are stronger when molten, (3) the ionomers of this invention provide good adhesion to metal, e.g., aluminum, foils, and (3) films made from ionomers of this invention have improved clarity. In addition, when the ionomers of this invention and ionomers made from conventional ethylene-alkyl acrylate copolymers are formed into strands and stretched, the ionomers of this invention stay nearly transparent, do not whiten and have a higher tensile strength than the unstretched strand, whereas the stretched strands made from conventional ionomers turn white and "foamy" and become weaker.

Ethylene-sodium acrylate-methyl acrylate terpolymers (ionomers) made from conventional, ethylene-methyl acrylate copolymers having random acrylate unit sequence distribution are heterogeneous due to the limited capability of the randomly dispersed methyl acrylate groups to homogenize the sodium acrylate aggregates by solvation. These conventional terpolymers have exhibited two-phase morphology in which a sodium-rich phase is dispersed in a sodium-poor matrix. The aggregates are usually larger than one micron in diameter. As a result, films fabricated from these conventional terpolymers have poor optical properties, such as high haze and low gloss values. The heterogeneity also causes anisotropy in fabricated articles in the sense that films or extrudates turn opaque as they are stretched. The inherent structure and morphology of these conventional terpolymers with randomly distributed acrylate groups result in low values of the ultimately achievable performance properties.

On the other hand, ethylene-sodium acrylate-methyl acrylate terpolymers (ionomers) made from the ethylene-methyl acrylate copolymers of this invention have a unique acrylate comonomer sequence distribution in comparison with the conventional terpolymers. A higher percentage of acrylate groups in the ionomers of this invention is distributed in blocks, i.e., methyl acrylate groups are bonded to each other. The solubilization of the sodium acrylate groups in the terpolymers of this invention is thus provided by the localized high polarity region in which one or more of the blocks of methyl acrylate are located. This type of structural character produces local regions of high polarity which efficiently solubilize the ionic clusters of sodium acrylate to form much smaller clusters which can not even be observed by Scanning Electron Microscopy (SEM).

The smaller size of the ionic clusters of the ionomers of the present invention causes the polymers to have a homogeneous, one-phase morphology. This dispersion of the smaller size but larger number of ionic groups significantly increases the interfacial area between the ionic clusters and the matrix versus the conventional terpolymers. This, n turn, produces polymers with lower melt flow rates.

As used herein, the term "inorganic alkali metal base" refers to basic compounds which contain a metal from Group I of the Periodic Table as a cation, and an inorganic anion. For the purposes of this invention, a carbonate anion is considered to be inorganic. Examples of the inorganic alkali metal bases useful in preparing saponified products include, but are not limited to, alkali metal hydroxides (such as NaOH, KOH and LiOH), alkali metal oxides (such as $Na_2O$, $K_2O$ and $Li_2O$) and alkali metal carbonates (such as $Na_2CO_3$, $K_2CO_3$ and $Li_2CO_3$). A preferred metal base is NaOH.

In a preferred embodiment, the saponification reaction is carried out at relatively high temperatures so that the ethylene-alkyl acrylate copolymer will undergo a phase change. As used herein, the phrase "undergo a phase change" means that the ethylene-alkyl acrylate copolymer (which is a solid at room temperature) has been heated at least to the point where it is readily deformed. Generally, this will mean that the copolymer has been heated until it is converted to a molten or fluid state. In general, the reaction temperature may be from about 180° C. to about 300° C. Higher reaction temperatures may be used, though discoloration and/or degradation of the polymer may occur. Likewise, lower temperatures may be used, but these lower temperatures may require excessively long reaction times. Preferably, the reaction temperature will be from about 200° C. to about 280° C.

This preferred saponification process can be conducted in any suitable mixing device such as a Brabender Plasticorder, a roll mill, a single or multiple screw extruder or any other of the well known mechanical mixing equipment normally used in the mixing, compounding, processing or fabrication of low or high molecular weight thermoplastic, elastomeric or thermosetting polymers or mixtures thereof. An extruder having one or more ports is a particularly desirable reaction vessel, although it is by no means necessary insofar as the saponification reaction can be done in other reaction vessels. Suitable extruders are described in U.S. Pat. No. 4,857,600, issued Aug. 15, 1989 to Gross et al., which is incorporated herein by reference. The saponification reaction preferably occurs in a reactive extruder, where the ethylene-alkyl acrylate copolymer can be injected molten or be melted in situ, and where the alkali metal base can be added into the first and/or subsequent reaction zones.

Preferably, the residence time for the reaction mixture in an extruder will generally be about 0.1 to about 30 minutes, the particular residence time being chosen so that the desired level of saponification is achieved. Of course, the residence time may vary depending upon the particular reaction conditions employed, the reaction temperature, throughput, extruder RPM, and the like.

The products of the reaction are an alkanol (the alkyl group of which comes from the alkyl acrylate comonomer) and a terpolymer of ethylene, alkyl acrylate, and an alkali metal salt of acrylic acid, assuming, that is, that less than 100% of the alkyl acrylate is saponified. The degree of saponification can be varied, and is controlled by the amount of inorganic alkali metal base used and reaction conditions. While the essentially all of the acrylate groups on the copolymer can be saponified, this generally results in a highly crosslinked, extremely tough material which may be difficult to process. Generally, therefore, about 2% to about 90%, preferably about 5% to about 70%, more preferably about 10% to about 60% of the acrylate groups on the copolymer are saponified. The resulting terpolymer has some remaining ester groups, which desirably function as a plasticizer.

After reaction completion, any water and by-product alkanol remaining in the reaction product can be removed, for example, by devolatilization. Also, any unreacted inorganic alkali metal base remaining in the reaction product will usually be neutralized.

C. Anhydride-Modified Ethylene-Alkyl Acrylate Copolymers

The polymers of this invention can be anhydride-modified to produce grafted polymers. Methods of making the grafted copolymers include combining molten ethylene-alkyl acrylate copolymer with one or more unsaturated acid anhydrides, such as anhydrides of unsaturated diacids having 4 to 20 carbon atoms. Examples of such anhydrides include, but are not limited to, maleic anhydride, itaconic anhydride, and crotonic anhydride. The preferred anhydride is maleic anhydride. Preferably, the anhydride is either molten or dissolved in an inert solvent when it is added to the ethylene-alkyl acrylate copolymer.

The reaction is conducted in the presence of a free radical initiator, such as a peroxide, under appropriate reaction conditions and temperature to produce a grafted copolymer product.

The grafting reaction preferably occurs in a multi-zone reactor, such as a reactive extruder, where the ethylene-alkyl acrylate copolymer can be injected molten or melted in situ, and where the anhydride and initiator can be added into the first and/or subsequent reaction zones.

Methods of making such grafted copolymers are well-known in the art. U.S. Pat. No. 4,506,056, issued Mar. 19, 1985 to Gaylord and U.S. Pat. No. 4,762,890, issued Aug. 9, 1988 to Strait et al., which are incorporated herein by reference, describe two methods for grafting maleic anhydride to ethylene-alkyl acrylate copolymers.

The amount of anhydride-modified ethylene-alkyl acrylate copolymers of this invention may contain a wide range of grafted anhydride. In general, they will contain from about 0.05 to about 5 weight percent, preferably about 0.1 to 05 about 5 weight percent, and more preferably about 0.1 to about 2.0 weight percent anhydride, based on the weight of the ethylene-alkyl acrylate copolymer.

EXAMPLES

The following examples are for illustration and are not intended to be limiting on the scope of the invention.

Example 1

Emac and EBAC Preparation Having 20 Weight Percent Methyl Acrylate or Butyl Acrylate A conventional EMAC and EBAC, and an EMAC and this invention, were prepared in a 4-zone autoclave reactor, as illustrated in FIG. 1. The ethylene and methyl acrylate ("MA") or, alternatively, butyl acrylate ("BA"), were fed into the reactor so that varying proportions of the MA or BA were fed into Zone 1.

The ethylene was charged to the reactor at a rate of 12,000 lbs./hr., with about half being fed to Zone 1 and about half to Zone 2. The ethylene charged to the reactor had a purity of about 99.9% and contained less than 10 ppm of oxygen.

In this way, copolymers of this invention were produced where the amount of alkyl acrylate fed to Zone 1 was at least 55% of the amount of alkyl acrylate fed overall to the reactor.

The reaction mixture was discharged from the reactor as molten polymer. Unreacted ethylene was separated and recycled. Using a gear pump, the EMAC or EBAC copolymer was extruded through a die having a series of ⅛" holes into a water bath at 90° F. The resulting strands were pelletized and dried. The ethylene-methyl acrylate copolymer that was obtained contained 20–21 wt % methyl acrylate, and the EBAC contained 19–20 wt % butyl acrylate. Properties of the copolymers so obtained are summarized in Table 1 below.

Melt-point temperatures for the copolymers were measured by using a Perkin-Elmer Differential Scanning Calorimeter DSC-7 and by utilizing standard methods well known in the art. The copolymers of this invention exhibit melt-point temperature relationships as a function of alkyl acrylate content as shown in FIGS. 2 and 3. These Figures also show the melt-point temperatures of the respective conventional copolymers.

TABLE 1

| Experiment Number | Wt. % and Type of Comonomer in Ethylene Copolymer[2] | Melt-point Temp. °F. | Cryst. %[3] | % of Alkyl Acrylate Fed to Reactor Zone 1 | Ratio of $A_1/E_1$ to A/E in Zone 1 | Shore A Hardness | Shore D Hardness | Vicat, °F. |
|---|---|---|---|---|---|---|---|---|
| A | 20 MA | 183 | 12 | 0 | 0.0 | 91 | 35 | 140 |
| B | 20 MA | 181 | 12 | 25 | 0.5 | 91 | 35 | 144 |
| C[1] | 21 MA | 181 | 9 | 50 | 1.0 | 90 | 34 | 131 |
| 1 | 20 MA | 196 | 10 | 75 | 1.5 | 89 | 34 | 129 |
| 2 | 21 MA | 199 | 12 | 100 | 2.0 | 89 | 32 | 133 |
| D[1] | 21 BA | 190 | 11 | 50 | 1.0 | 91 | 32 | 142 |
| 3 | 22 BA | 203 | 12 | 100 | 2.0 | 89 | 30 | 126 |

[1]Experiments C and D are conventional copolymers and are comparative experiments.
[2]MA—methyl acrylate
BA—butyl acrylate
[3]Crystallinity MA or BA was fed to the reactor at an overall rate of about 370 lb./min. The percent of MA injected into Zone 1 was varied in increments of 25% in separate runs, so that it ranged from 0% to 100% of the MA fed to the reactor. For the BA, the percent of BA injected into Zone 1 was either about 50% or 100% of the BA fed to the reactor. The ratio of the quantity $A_1/E_1$ to the quantity A/E is shown in Table 1 below for the experimental feed splits. The copolymers of this invention were produced when the percent of the alkyl acrylate fed to reactor Zone 1 was greater than about 55% and when the ratio of the quantity $A_1/E_1$ to the quantity A/E exceeded 1.

The MA and BA each contained about 50 ppm methyl ethyl hydroquinone, a polymerization inhibitor, and each had an oxygen content of less than 20 ppm. The initiator, tertiary butyl peroxy pivalate, was dissolved in a hydrocarbon carrier and introduced into the first and second reaction zones at a rate of 4.8 lbs./hr., which is 380 ppm based upon the weight of monomers charged. The polymerization was conducted at pressures and temperatures typically used to prepare ethylene-alkyl acrylate copolymers. Good mixing was provided in each zone via internal agitation. Butylated hydroxyethylbenzene (BHEB) was added at a rate to maintain 650 ppm based on polymer produced.

Example 2

Measuring the Alkyl Acrylate Content of the Copolymer

The alkyl acrylate content of the copolymers made in Example 1 was measured by Fourier Transform Infra-Red spectroscopy (FT-IR). A sample of devolatilized copolymer was pressed into a thin film and scanned in the infrared region. The procedure used a Nicolet Model No. 510 FT-IR scanning infrared spectrophotometer. Seven to ten pellets (about ½ gram) or an appropriately-sized molded article were placed between two pieces of Mylar, approximately 4.75 mils thick. A 1" wide strip of Mylar was placed on top of the Mylar release sheet, so that it would cover the center of the sample. The Mylar "sandwich" was placed between 8"×8" platens of a 50,000 psig capacity Pasadena Hydraulics heated hydraulic press. The press was brought up to contact pressure (<1000 lbs.) at a temperature of about 350° F. The copolymer was allowed to melt (about 45 secs.). The press was then brought to 40,000 lbs. pressure, which was maintained for 10 secs. The pressure was released, and the samples were withdrawn. The sample was placed between two steel plates and allowed to cool (2 minutes).

As specified below, the areas of interest were measured, and a ratio of absorbance values was obtained. The weight percent of methyl acrylate was determined from FIG. 4, which is a correlation chart for absorbance ratio versus weight percent methyl acrylate in EMAC. The weight percent of butyl acrylate was determined from FIG. 5, which is a correlation chart for absorbance ratio versus weight percent butyl acrylate in EBAC.

Figure 4:
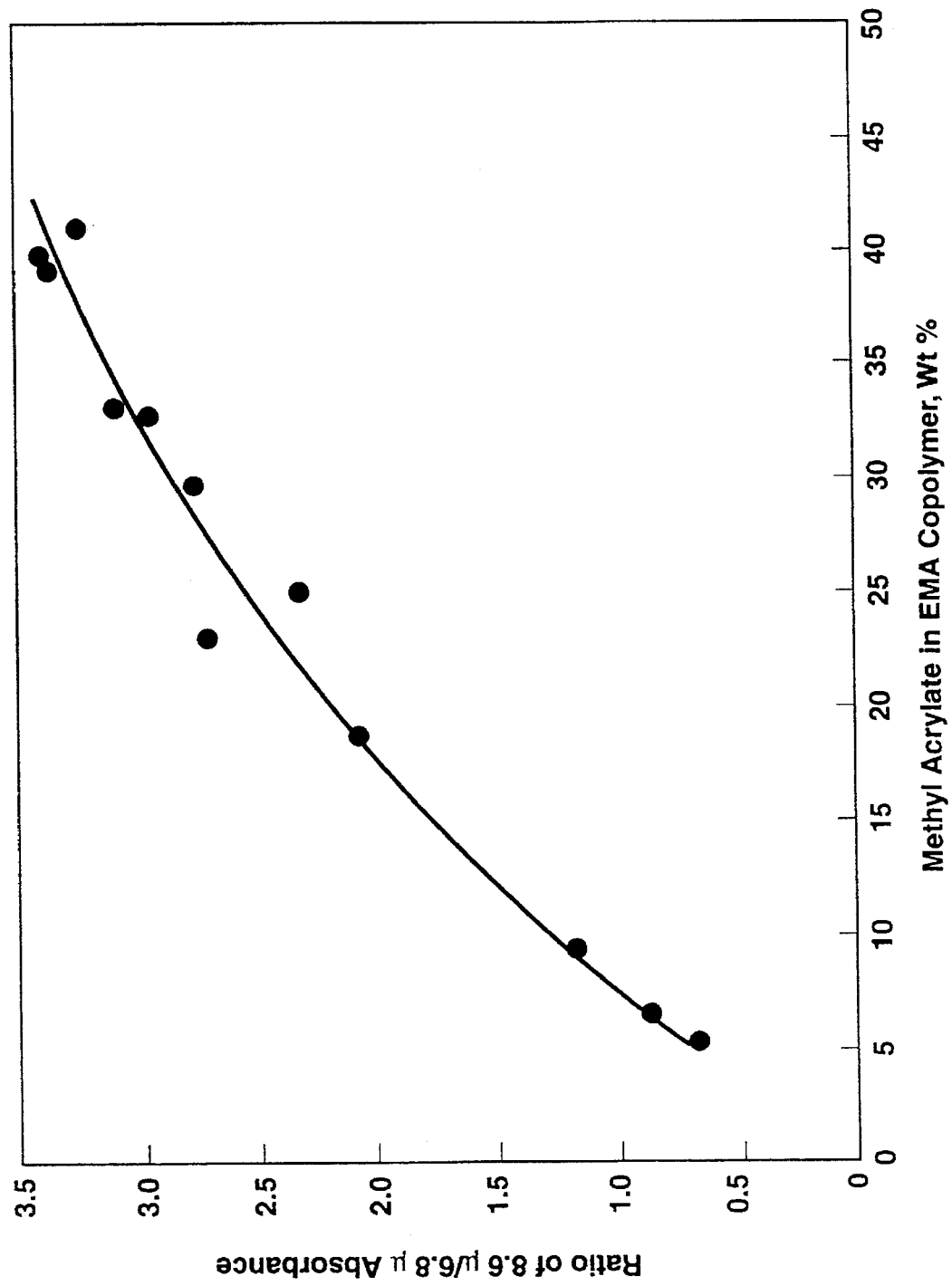
FIGS. 4 and 5 are correlation curves which give the relationship between the weight percent of methyl acrylate ("MA") in EMAC (FIG. 4) or weight percent of butyl acrylate ("BA") in EBAC (FIG. 5), and the ratio of 8.6µto 6.8µabsorbances, as measured by Fourier Transform Infra-Red ("FT-IR") analysis.
Figure 5:
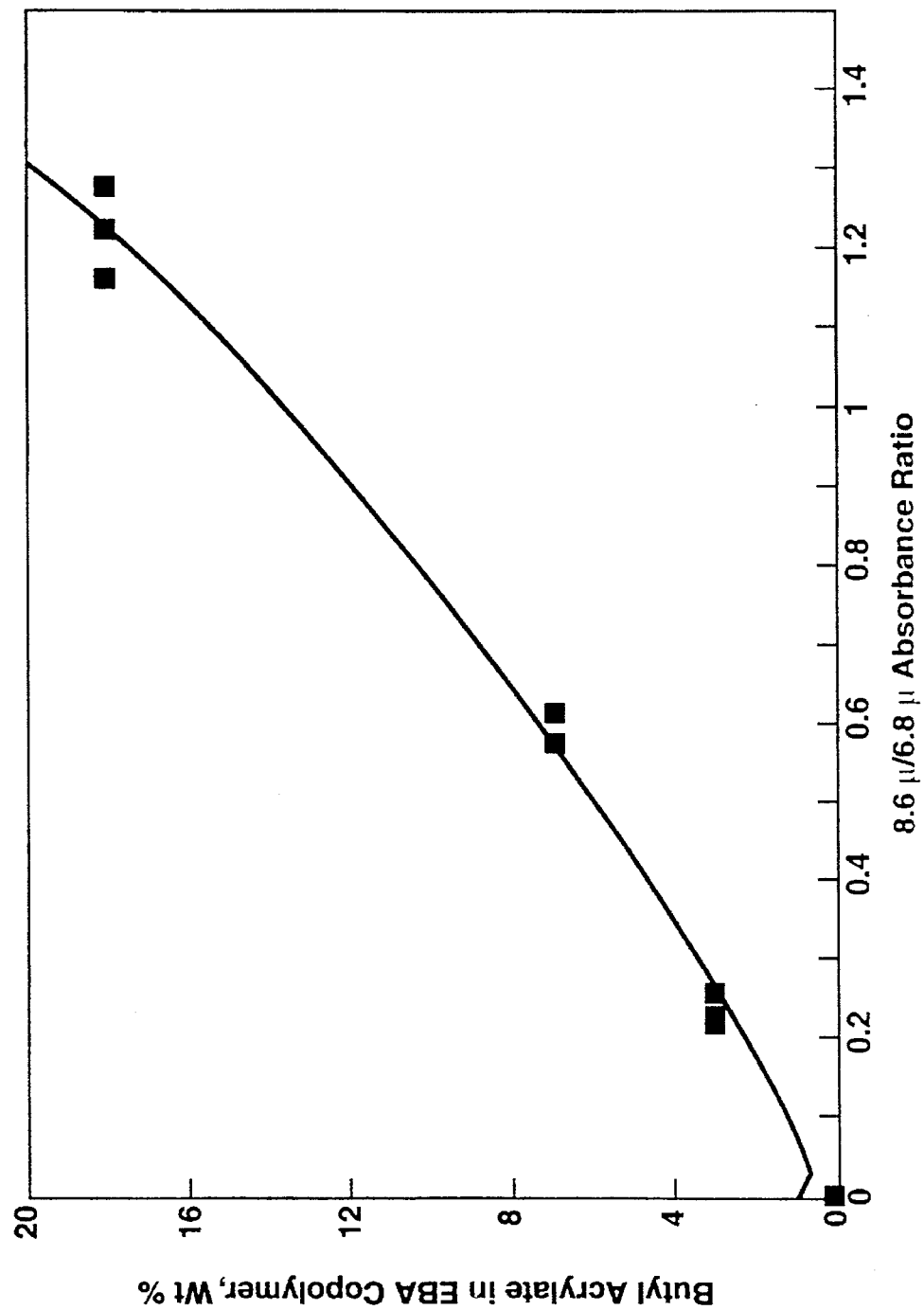
Figure 6:
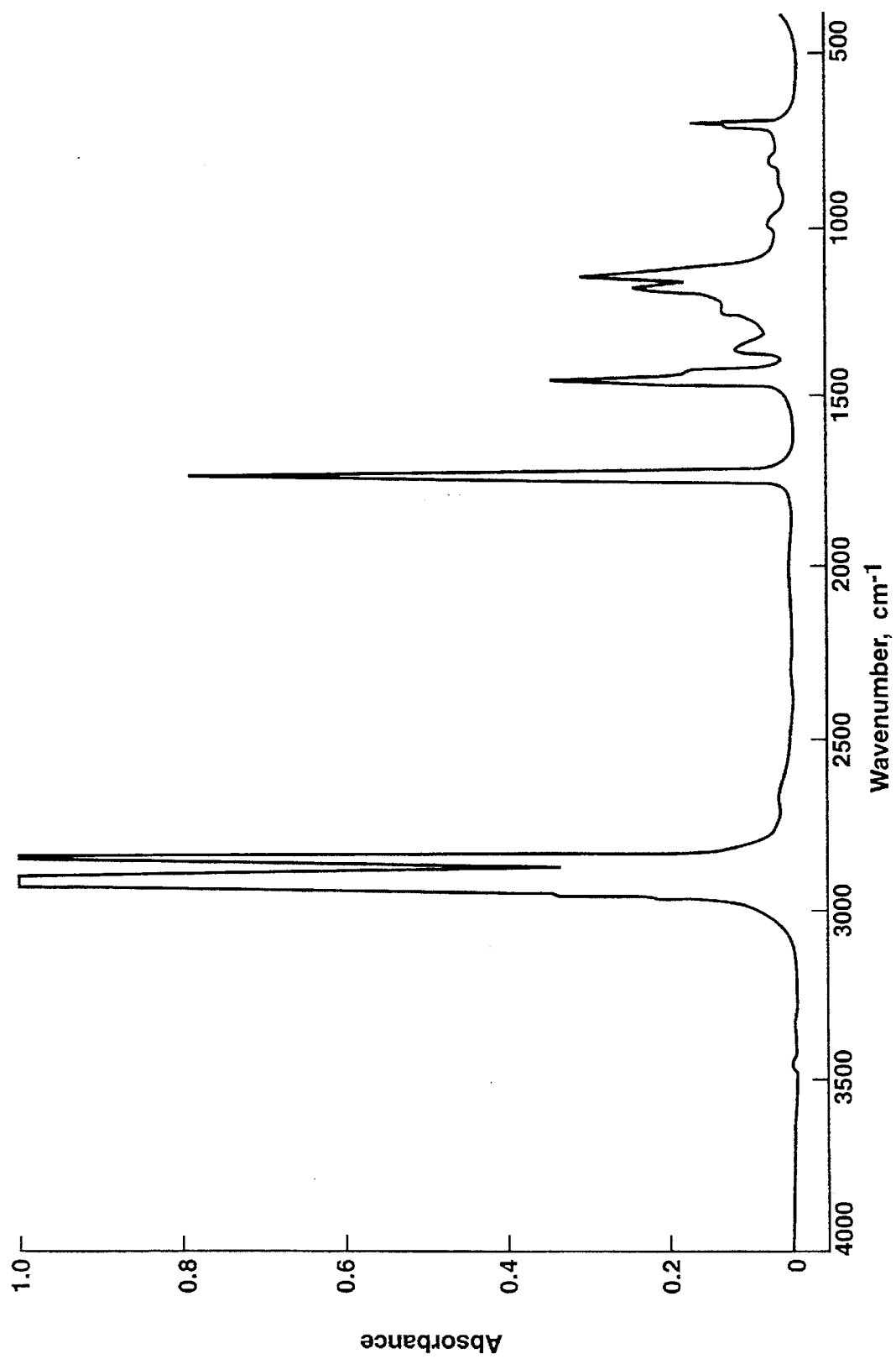
FIGS. 6 and 7, respectively, are examples of FT-IR spectra for an EMAC with MA content of about 20.6 wt % in the copolymer and an EBAC with BA content of about 20 wt % in the copolymer.
Figure 7:
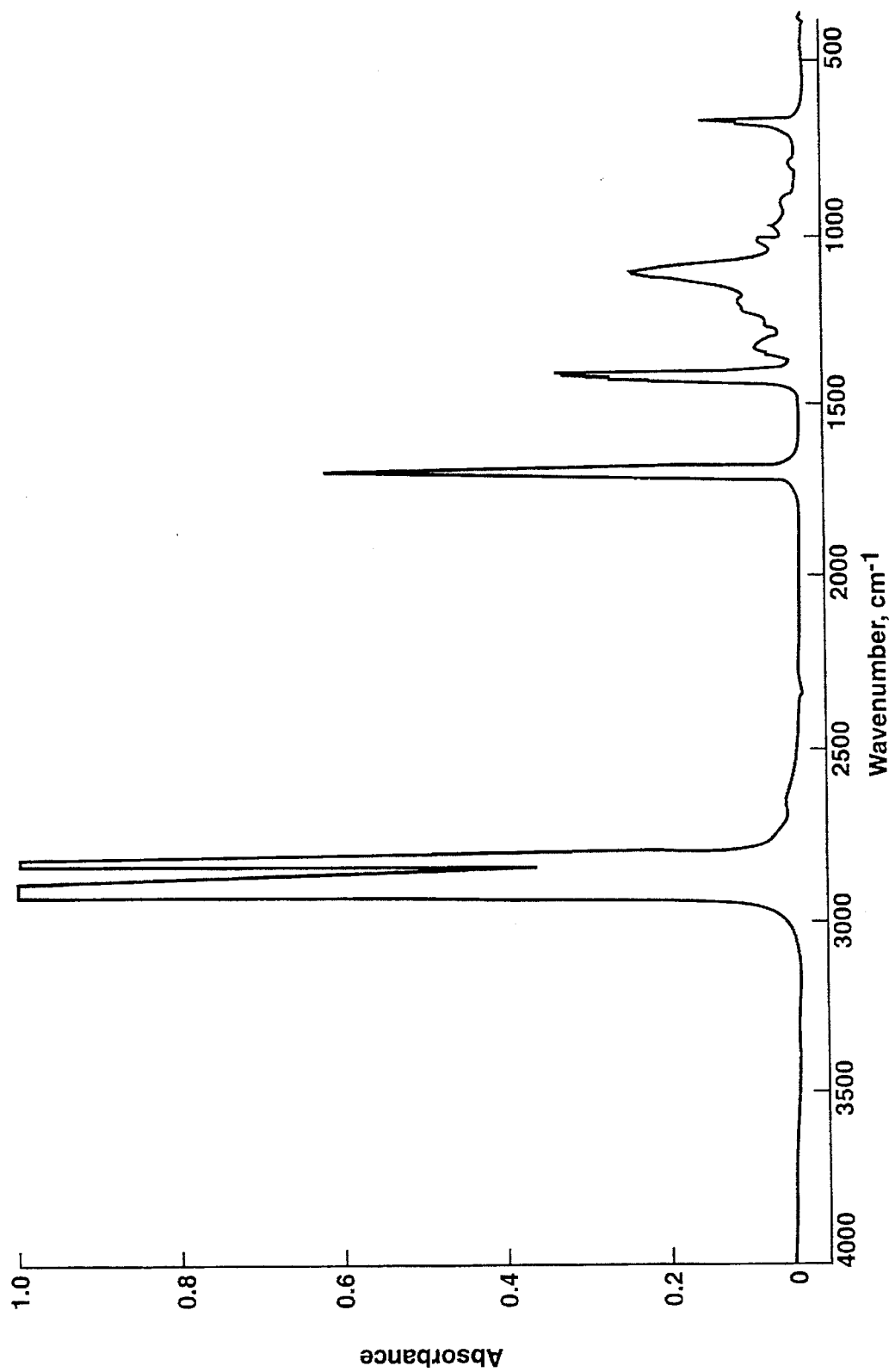

FIGS. 4 and 5 were derived from samples of conventional EMAC and EBAC which were assigned nominal values of MA or BA content, based upon information from the supplier of the samples. For other ethylene-alkyl acrylate copolymers, such standard techniques as NMR or elemental analysis can be used to develop correlation graphs similar to those of FIGS. 4 and 5.

The Mylar was carefully removed from the pressed sample. The center area of the pressed sample was mounted to a metal holder. It is important not to stretch the sample, since stretching can cause erroneous results.

A. Determination of Weight % MA in EMAC

The mounted sample was placed in the infrared beam and scanned from 4000 to 400 cm$^{-1}$. The area from 1518.75–1407.42 cm$^{-1}$ was integrated and labelled as the 6.8μabsorbance. The area from 1323.93–1047.61 cm$^{-1}$ was integrated and labeled as the 8.6μabsorbance. The ratio of the 8.6μabsorbance to the 6.8μabsorbance was used to determine the MA content of the copolymers. Percent methyl acrylate was read directly from FIG. 4, which defines the relationship between the ratio of the 8.6μabsorbance to the 6.8μabsorbance and the weight percent methyl acrylate in EMAC.

B. Determination of Weight. % BA in EBAC

The sample was formed and mounted as described above, and placed in the infrared beam and scanned from 4000 to 400 cm$^{-1}$. The area from 1501–1409 cm$^{-1}$ was integrated and labelled as the 6.8μabsorbance. The area from 1225–1046 cm$^{-1}$ was integrated and labeled as the 8.6μabsorbance. The ratio of the 8.6μabsorbance to the 6.8μabsorbance was used to determine the BA content of the copolymers. Percent butyl acrylate was read directly from FIG. 5, which defines the relationship between the ratio of the 8.6 μabsorbance to the 6.8μabsorbance and the weight percent butyl acrylate in EBAC.

Example 3

Measurement of Dynamic Visco-Elastic Properties

The dynamic visco-elastic properties of EMAC and EBAC were measured using a Rheometrics RDA-700 analyzer. A disc of the copolymer was molded, and the dynamic characteristics of the copolymer were analyzed by placing the sample between two circular parallel plates on the RDA and subjecting the sample to varying oscillatory strains and temperatures. The loss tangent is calculated from these measurements.

A. Preparation of the Copolymer Sample

A molded disc of copolymer having a diameter of about 25 mm. and a thickness of about 3–4 mm. was made by placing a sample of the copolymer within an appropriately-sized cylinder, applying constant mechanical pressure to the sample, and gradually increasing the temperature of the sample to the lowest temperature at which the sample can be molded. This temperature is a function of the type of copolymer being molded, and can be readily determined by one skilled in the art. Once the sample reached its molding temperature, it was compressed slightly to remove air bubbles. The thickness of the disc after this compression was about 3–4 mm. The sample was cooled to ambient temperature and permitted to sit for 24 hours before being analyzed.

B. Preparation for RDA Analysis of the Copolymer

The RDA uses two identical 4 mm. diameter plates which have toothed surfaces. One plate imparts a strain to the copolymer, while the second plate transmits the resulting stress from the copolymer to the measuring equipment within the RDA. Smooth plates may also be used, since the toothed surfaces are not necessary to measure the stress and strain within the temperature range 32° F. –212° F. If stress and strain measurements are taken below about –75° F., the toothed plates are preferred.

The molded sample was placed between the 4 mm. plates and held at its molding temperature for 3 minutes. The sample was then squeezed to a thickness of about 2.3 mm., and the excess sample was trimmed while it was being squeezed and maintained at its molding temperature so that the disc of copolymer between the plates was about 4 mm. in diameter.

C. Sample Analysis

The procedure for sample analysis is essentially the method specified by the manufacturer of the RDA. The RDA chamber holding the squeezed copolymer was cooled to a temperature of about –150° F. One plate of the RDA subjected the sample to a radial and oscillatory strain at a frequency of about 1 rad./sec., and stress and relative phase angle measurements were taken. The frequency was increased 1 rad./sec., and further measurements were taken. This procedure was repeated until the frequency reached 10 rad./sec. From 10 rad./sec., the frequency was increased in increments of 10 rad./sec., and measurements were taken at each increment until the frequency reached 100 rad./sec. The temperature was increased about 36° F., and this process of measuring the stress and relative phase angle was repeated until the last set of measurements was made at a temperature of about 300° F. The RDA measures both the resulting stress transmitted by the copolymer sample and the relative angle between the plates. The loss tangent is calculated from these measurements, as discussed previously. FIGS. 8–11 show the loss tangents for conventional EMAC, EMAC of the present invention, conventional EBAC and EBAC of this invention, respectively, as a function of temperature, at a constant frequency of 10 rads/sec.

Example 4

Solvent Extraction

Films of EBAC copolymer with and without about 12 wt % low density polyethylene (LDPE) were prepared by mixing the conventional EBAC polymer pellets of Comparative Experiment D or the EBAC copolymer of this invention from Experiment 3, about 12 wt % low density polyethylene (where used), an anti-block agent and a slip additive in an extruder and then blowing into a film with a thickness of 1.25 mil. These films were contacted with solvent to determine chemical resistivity. The films produced had the properties set forth in Table 2 below. These results were obtained through the following procedures:

(a) n-Hexane (spectro-grade) –0.5 gram of a 1 mil film was heated in 200 ml of hexane at 50° C. for 2 hours. The hexane fraction was decanted into a tared beaker, and the hexane was evaporated to dryness. Weight percent extraction was calculated by dividing the weight of the residue in the beaker by the original sample weight and expressing as a percentage.

(b) Xylene (American Chemical Society reagent grade which was re-distilled through a fractionating column) −1.0 gram of 1 mil film was heated in 200 ml of xylene held at a temperature just sufficient to maintain reflux for 2 hours. The xylene fraction was decanted into a tared beaker, and the xylene was evaporated to dryness. Weight percent extraction was calculated as above.

These methods are similar to those set forth in 21 C.F.R. part 177 (1991), and particularly in 21 C.F.R. sec. 177.1520 (1991), which are incorporated herein by reference.

TABLE 2

EBAC Films Solvent Extraction

| Experiment Number[4] | % BA fed to Zone 1 | % LDPE[5] in Blend | Weight % Solubility in Hexane | Weight % Solubility in Xylene |
|---|---|---|---|---|
| Comp. E | 50 | 0 | 41 | 89 |
| 4 | 100 | 0 | 19 | 43 |
| Comp. F | 50 | 12 | 27 | 39 |
| 5 | 100 | 12 | 20 | 22 |

[4]Comparative Experiments E and F utilize conventional EBAC, while Experiments 4 and 5 use EBAC of this invention.
[5]% LDPE—weight percent of low-density polyethylene in blend with EBAC.

TABLE 3

EMAC Films Solvent Extraction

| Experiment Number[4] | % MA fed to Zone 1 | % LDPE in Blend | Weight % Solubility in Hexane | Weight % Solubility in Xylene |
|---|---|---|---|---|
| Comp. G | 0 | 0 | 53 | 93 |
| Comp. H | 25 | 0 | 51 | 89 |
| Comp. I | 50 | 0 | 59 | 89 |

TABLE 3-continued

EMAC Films Solvent Extraction

| Experiment Number[4] | % MA fed to Zone 1 | % LDPE in Blend | Weight % Solubility in Hexane | Weight % Solubility in Xylene |
|---|---|---|---|---|
| 6 | 75 | 0 | 18 | 59 |
| 7 | 100 | 0 | 12 | 43 |

Examples 5-7 and Comparative Examples J-K
Continuous Saponification of EMAC of this
Invention in am Extruder A Werner & Pfleiderer corrosion resistant extruder was fitted with a liquid injection system. Downstream extruder equipment included a water cooling bath and a pelletizer.

The extruder was started, followed by the solid feeder and the liquid feeder. EMAC containing about 24 wt % methyl acrylate and having a melt index (MI) of 20 gms/10 min. was fed into the extruder, and was reacted in the extruder with an aqueous sodium hydroxide solution. The saponification reaction started in the injection zone and continued through the reaction zone. Excess water and by-product methanol were removed in a devolatilization zone. The reaction product was extruded through a die as strands, cooled in a water bath and pelletized. Reaction conditions, and characteristics of the resulting ionomer for three typical experiments are shown in Table 4 below.

TABLE 4

| Example No. | EMAC Feed (lbs/hr) | 50% aq. NaOH (lbs/hr) | Reaction Temperature (°C.) | Screw Speed (rpm) | Melt Index (gms/10 min) | Wt % Sodium Acrylate[6] |
|---|---|---|---|---|---|---|
| 5 | 100 | 3.2 | 270 | 400 | 0.2 | 3.6 |
| 6 | 100 | 4.6 | 255 | 400 | 0.1 | 5.0 |
| 7 | 150 | 4.7 | 255 | 400 | 2.0 | 3.4 |

[6]Weight percent sodium acrylate based on weight of terpolymer.

By way of comparison, ionomers are prepared from conventional a ethylene-methyl acrylate copolymer which contained about 24% methyl acrylate by weight and had a melt index of 20 gms/10 min. The saponification reaction was accomplished in the same extruder as described above for Examples 5-7. The reaction conditions and product properties are shown on Table 5 below.

TABLE 5

| Comp. Example | EMAC Feed (lbs/hr) | 50% aq. NaOH (lbs/hr) | Reaction Temperature (°C.) | Screw Speed (rpm) | Melt Index (gms/10 min) | Wt % Sodium Acrylate |
|---|---|---|---|---|---|---|
| J | 100 | 4.7 | 255 | 400 | 1.34 | 5.0 |
| K | 150 | 4.7 | 255 | 400 | 2.85 | 3.4 |

Example 8

NMR Analysis of Comonomer Sequence

This example provides the technique used in the $^{13}$C-NMR analysis used to characterize the comonomer sequence distribution of ethylene-alkyl acrylate copolymers. The $^3$C-NMR spectra were recorded on a Varian VXR-300 instrument. The spectra were referenced at 30.00 ppm using the carbon backbone of the ethylene-alkyl acrylate. The samples were dissolved in a 60:40 mixture by volume of 1,2,4-trichlorobenzene:deuterated benzene, where deuterated benzene was used as the internal lock solvent. The NMR spectra were recorded at 100° C. with 8 seconds delay between pulses. The assignment of the respective triad peaks were based on the peak positions published in literature [F. Keller and H. Roth, *Plaste Und Kautschuk*, 22(12), 956 (1975)]. During this analysis, the triad percentage was calculated based on the splitting of the methine group of the methyl acrylate unit, the following peaks were observed on the resulting NMR spectra:49.0±0.2 ppm (ethylene-methyl acrylate-ethylene triad), 45.8±0.2 ppm (ethylene-methyl acrylate-methyl acrylate triad), and 43.5±0.2 ppm (methyl acrylate-methyl acrylate-methyl acrylate triad).

The copolymer used in Examples 5–7 had 11.6% methyl acrylate-methyl acrylate-ethylene triad content, while the copolymer used in Comparative Examples J–K has only 10.5% of the same triad. Therefore, the $^{13}$C-NMR spectroscopy suggests that the copolymer used in Examples 5–7 contains a higher percentage of the blocks of methyl acrylate.

Example 9

Melt-Point Temperatures and Physical Properties of Ionomers

This example provides the property characterization of terpolymers (ionomers) of this invention and conventional terpolymers. The terpolymer produced in Example 6 had a tensile strength (measured using 0.075 in. thick compression molded sample at 20 in./min. crosshead speed according to ASTM No. D-638) of 1370 psi, 505% elongation and a melting point of 189° F., while the terpolymer produced in Example J from a conventional ethylene-methyl acrylate copolymer of the same weight percentage of methyl acrylate and the same melt index had a tensile strength of only 1040 psi, 445% elongation and a melting point of 163° F. Therefore, under very similar reaction conditions and terpolymer composition, the terpolymer from the present invention has a higher tensile strength and a higher melting point. Both of these improvements are highly desired for many applications of the resulting terpolymers.

Ionomers made in a manner similar to that described in Examples 5–7 using an EMAC of this invention and a conventional EMAC, each containing about 20% by weight methyl acrylate, contained 4.6 wt % sodium acrylate (based on the weight of the ionomer) and had melt-points of 201° F. and 183° F., respectively.

Example 10

Sem Studies of Ionomers

This example provides the results of the scanning electron microscopy (SEM) studies of terpolymers of this invention and conventional ionomers. The SEM micrographs were acquired on a JEOL JSM-820 scanning electron microscope. The samples of the terpolymers were unpelletized strands obtained from the extruder. The fracture surfaces of the samples were obtained by freezing the strands in liquid nitrogen and subsequently breaking the strands. The samples were mounted on carbon stubs using carbon paint adhesive and coated with gold/palladium for 30 seconds. They were then loaded into the microscope and subjected to a magnification of 2500X under a 10 KeV electron energy load.

The SEM micrographs revealed that an unstretched strand of the terpolymer from Comparative Example J was heterogeneous in morphology, and the size of the dispersed ion-rich phase was larger than 1 µm. After the strand was stretched, a more distinctly heterogeneous morphology formed. Macroscopically, the stretching of the strand caused it to turn opaque.

The SEM micrographs of an unstretched strand of the terpolymer of this invention from Example 6 revealed that the terpolymer was homogeneous and only one phase. After stretching, the morphology remained homogeneous. Macroscopically, stretching did not cause the strand to turn opaque.

Example 11

Optical Film Properties of Ionomers

Cast films were prepared from an EMAC of this invention (20% by weight methyl acrylate, melt index 50 gms/10 min.), ionomers of this invention made therefrom and conventional ionomers made from a similar, conventional EMAC. Samples of each polymer were each in turn extruded to cast films on a Randcastle. The temperature profile was 430° F. at all zones, and the screw speed was 100 rpm.

The cast film made from the EMAC of this invention had a haze of 14.6%, as did the ionomer of this invention. However, the film made from the conventional ionomer had a haze of 86%. In addition, the film made from the EMAC of this invention had a 60° Gardner gloss value of 69, and the ionomer made therefrom had a gloss value of 56. However, the film made from the conventional ionomer had a 60° Gardner gloss value of only 10.

Example 12

Maleic Anhydride Grafting of Ethylene-Methyl Acrylate Copolymer

EMAC of this invention is grafted with maleic anhydride ("MAH") in a conventional manner using a Werner and Pfleiderer co-rotating twin screw extruder. The MAH is added to the EMAC in molten form. A peroxide initiator (in heptane) was also added to the extruder. The starting EMAC contained about 20 wt % methyl acrylate and had a melt index of 10–12. Sufficient MAH was used to produce a product containing about 0.3 wt % MAH grafted onto the EMAC. The resulting MAH-grafted EMAC had a melt index of about 5.

What is claimed is:

1. A composition comprising a homogeneous blend of a polyolefin and an ethylene-alkyl acrylate copolymer having an alkyl acrylate content of X weight percent, X being greater than ten and being based on the total weight of ethylene and alkyl acrylate in the copolymer, said copolymer having an average melt-point temperature equal to or greater than the value obtained from the expression:

temperature (deg F.)=238−2.16X wherein the average melt-point temperature is about 10° F. greater than a copolymer having the same alkyl acrylate content and prepared by dividing the ethylene monomer and alkyl acrylate monomer equally among reactor zones.

2. The composition of claim 1 wherein the alkyl acrylate content of the copolymer is equal to or greater than fifteen weight percent.

3. The composition of claim 2 wherein the alkyl acrylate content of the copolymer is equal to or greater than twenty weight percent.

4. The composition of claim 3 wherein the alkyl acrylate content of the copolymer is equal to or greater than twenty-five weight percent.

5. The composition of claim 1 wherein the copolymer has an average melt-point temperature less than the value obtained from the expression:

temperature (deg F.)=257−1.56X.

6. The composition of claim 1 wherein the alkyl acrylate of the copolymer is methyl acrylate, ethyl acrylate, butyl acrylate or mixtures thereof.

7. A composition comprising a homogeneous blend of a polyolefin and an ethylene-alkyl acrylate copolymer, wherein the copolymer has less than a 0.06 difference between the maximum loss tangent value and the minimum loss tangent value in the range 32°–140° F.

8. The composition of claim 7 where the ethylene-alkyl acrylate copolymer is an ethylene-methyl acrylate copolymer.

9. The composition of claim 7 where the ethylene-alkyl acrylate copolymer is an ethylene-butyl acrylate copolymer.

10. A composition comprising according to claim 9 a homogeneous blend of a polyolefin and an ethylene-alkyl acrylate copolymer, wherein the copolymer has a rate of change of loss tangent with temperature of less than or equal to $2.0\times10^{-3}$ °F.$^{-1}$.

11. A composition comprising a homogeneous blend of a polyolefin and an ethylene-methyl acrylate copolymer having a methyl acrylate content of Y weight percent, Y being greater than ten and being based on the total weight of ethylene and methyl acrylate in the copolymer, said copolymer having an average melt-point temperature greater than the value obtained from the expression:

temperature (deg F.)=248−2.9Y.

12. The composition of claim 11 wherein the methyl acrylate content of the copolymer is equal to or greater than thirteen weight percent.

13. The composition of claim 11 wherein the methyl acrylate content of the copolymer is equal to or greater than fifteen weight percent.

14. The composition of claim 11 wherein the methyl acrylate content of the copolymer is equal to or greater than seventeen weight percent.

15. The composition of claim 11 wherein the copolymer has an average melt-point temperature less than the value obtained from the expression:

temperature (deg F.)=263−2.3Y.

16. The composition of claim 11 wherein the ethylene-methyl acrylate copolymer has a melt-point temperature of about 197° F. and a methyl acrylate content of about 20 weight percent, based on the total weight of ethylene and methyl acrylate in the copolymer.

17. A composition comprising a homogeneous blend of a polyolefin and an ethylene-butyl acrylate copolymer having a butyl acrylate content of z weight percent, z being greater than seventeen and being based on the total weight of ethylene and butyl acrylate in the copolymer, said copolymer having an average melt-point temperature greater than the value obtained from the expression:

temperature (deg F.)=240−2.1z wherein the average melt-point temperature is about 10° F. greater than a copolymer having the same butyl acrylate content and prepared by dividing the ethylene monomer and butyl acrylate monomer equally among reactor zones.

18. The composition of claim 17 wherein the butyl acrylate content of the copolymer is equal to or greater than nineteen weight percent.

19. The composition of claim 17 wherein the copolymer has an average melt-point temperature less than the value obtained from the expression:

temperature (deg F.)=253−1.35Z.

20. A composition comprising a homogeneous blend of a polyolefin and an ethylene-butyl acrylate copolymer, wherein the copolymer has an melt-point temperature of about 206° F. and has a butyl acrylate content of about 20 weight percent based on the total weight of ethylene and butyl acrylate in the copolymer.

* * * * *